US011796627B2

(12) United States Patent
Chen et al.

(10) Patent No.: US 11,796,627 B2
(45) Date of Patent: Oct. 24, 2023

(54) RADAR DETECTION IN A WIRELESS LAN

(71) Applicant: Cypress Semiconductor Corporation, San Jose, CA (US)

(72) Inventors: Chih-Ning Chen, Taipei (TW); Chung-Yen Huang, Toufen (TW); Wen-Tong Kuo, Chupei (TW)

(73) Assignee: Cypress Semiconductor Corporation, San Jose, CA (US)

( * ) Notice: Subject to any disclaimer, the term of this patent is extended or adjusted under 35 U.S.C. 154(b) by 198 days.

(21) Appl. No.: 17/192,575

(22) Filed: Mar. 4, 2021

(65) Prior Publication Data

US 2021/0247484 A1   Aug. 12, 2021

Related U.S. Application Data

(63) Continuation of application No. 16/896,876, filed on Jun. 9, 2020, now Pat. No. 10,948,568.
(Continued)

(51) Int. Cl.
  *G01S 7/02* (2006.01)
  *H04W 84/12* (2009.01)
  (Continued)

(52) U.S. Cl.
  CPC .............. *G01S 7/021* (2013.01); *H04W 16/14* (2013.01); *H04W 24/02* (2013.01); *H04W 72/0453* (2013.01); *H04W 84/12* (2013.01)

(58) Field of Classification Search
  CPC .......... G01S 7/21; H04W 16/04; H04W 24/02
  (Continued)

(56) References Cited

U.S. PATENT DOCUMENTS 5,291,199 A * 3/1994 Overman ................ G01S 7/021
                                                         342/13
2004/0201517 A1   10/2004 Macfarlane et al.
(Continued)

FOREIGN PATENT DOCUMENTS

JP   2005102165 A   4/2005
JP   2007049694 A   2/2007
(Continued)

OTHER PUBLICATIONS

Japanese Office Action for International application No. 2022-516156 dated Sep. 13, 2022, 5 pages.
(Continued)

*Primary Examiner* — Bo Fan

(57) ABSTRACT

Disclosed are methods and systems for a WLAN device operating on DFS channels to calibrate the PRI as well as delays between partial pulses of received radar pulses that are impaired due to channel and filtering effects. The calibrated PRI may approximate the PRI of the transmitted pulses. The calibrated delay between the partial pulses estimates the interval between two partial pulses that originally belong to the same transmitted pulse. Using the calibrated PRI and the calibrated delay between partial pulses, the WLAN device may reconstruct the original pulses from received impaired pulses even when the impaired pulses are delayed and partial pulses of the original pulses. The WLAN device may use the calibrated results to correct the shortened PW and varying PRI of the impaired pulses to restore the partial pulses to their full PW with a relatively uniform PRI, increasing the probability of detecting the radar signals.

20 Claims, 38 Drawing Sheets

Related U.S. Application Data

(60) Provisional application No. 62/927,760, filed on Oct. 30, 2019, provisional application No. 62/899,481, filed on Sep. 12, 2019.

(51) Int. Cl.
*H04W 16/14* (2009.01)
*H04W 72/0453* (2023.01)
*H04W 24/02* (2009.01)

(58) Field of Classification Search
USPC .................. 342/13, 70, 175, 195, 368, 450
See application file for complete search history.

(56) References Cited

U.S. PATENT DOCUMENTS

| | | | |
|---|---|---|---|
| 2009/0160696 A1 | 6/2009 | Pare et al. | |
| 2009/0262004 A1 | 10/2009 | Wen et al. | |
| 2010/0105865 A1* | 4/2010 | Telford | C07K 14/315 435/325 |
| 2013/0307729 A1* | 11/2013 | Stensland | G01S 3/802 342/417 |
| 2016/0047885 A1* | 2/2016 | Wang | G01S 5/02 342/442 |

FOREIGN PATENT DOCUMENTS

| | | |
|---|---|---|
| JP | 2007274659 A | 10/2007 |
| JP | 2008005115 A | 1/2008 |
| JP | 2008281517 A | 11/2008 |

OTHER PUBLICATIONS

German Office Action for Application No. 112020004370.3 dated Nov. 9, 2022; 6 pages.

* cited by examiner

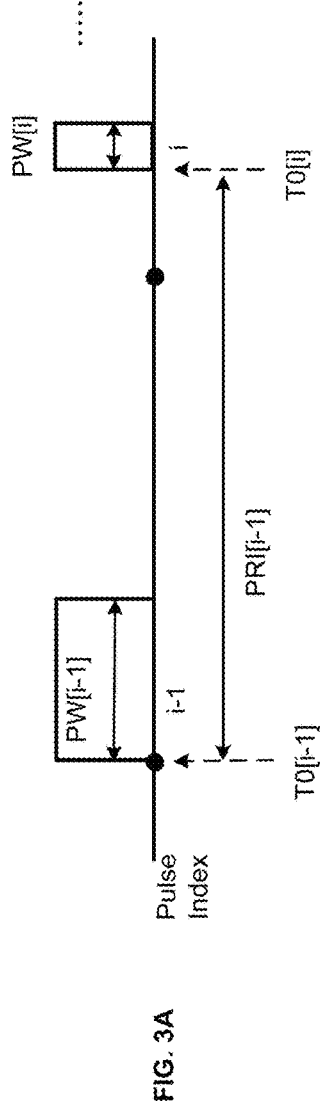
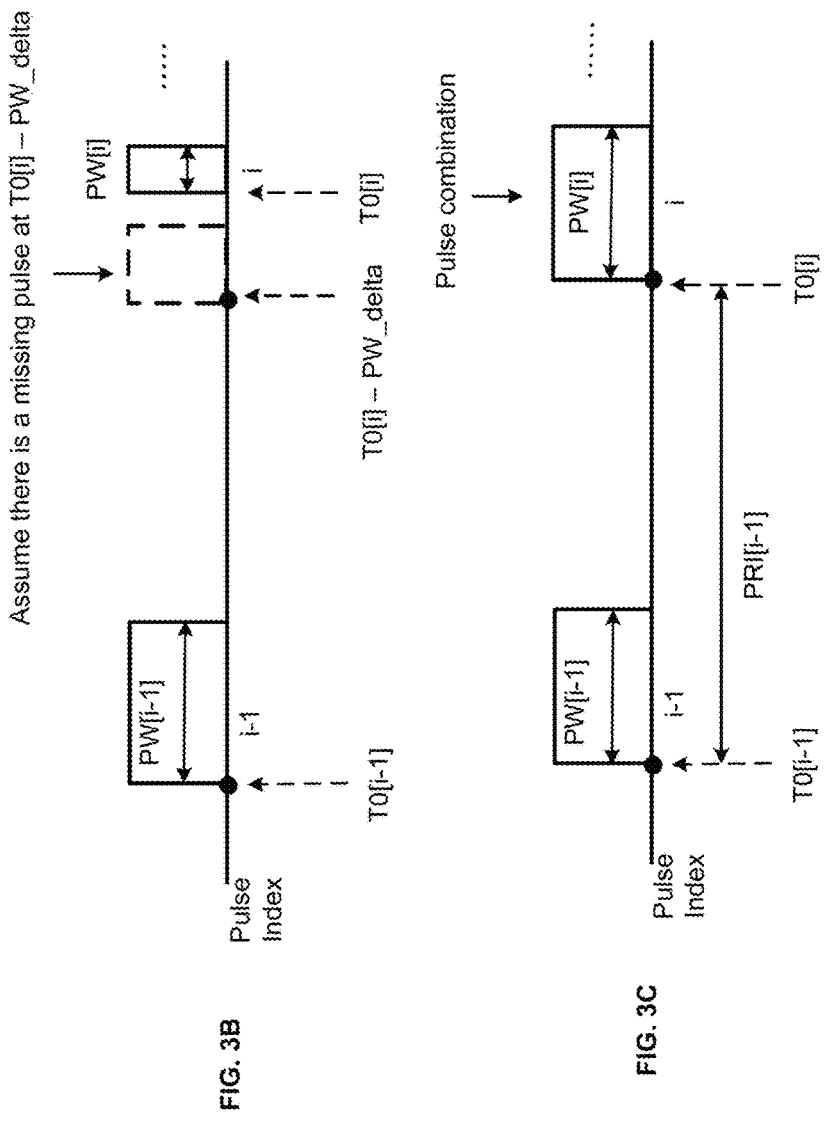
FIG. 3A
FIG. 3B
FIG. 3C

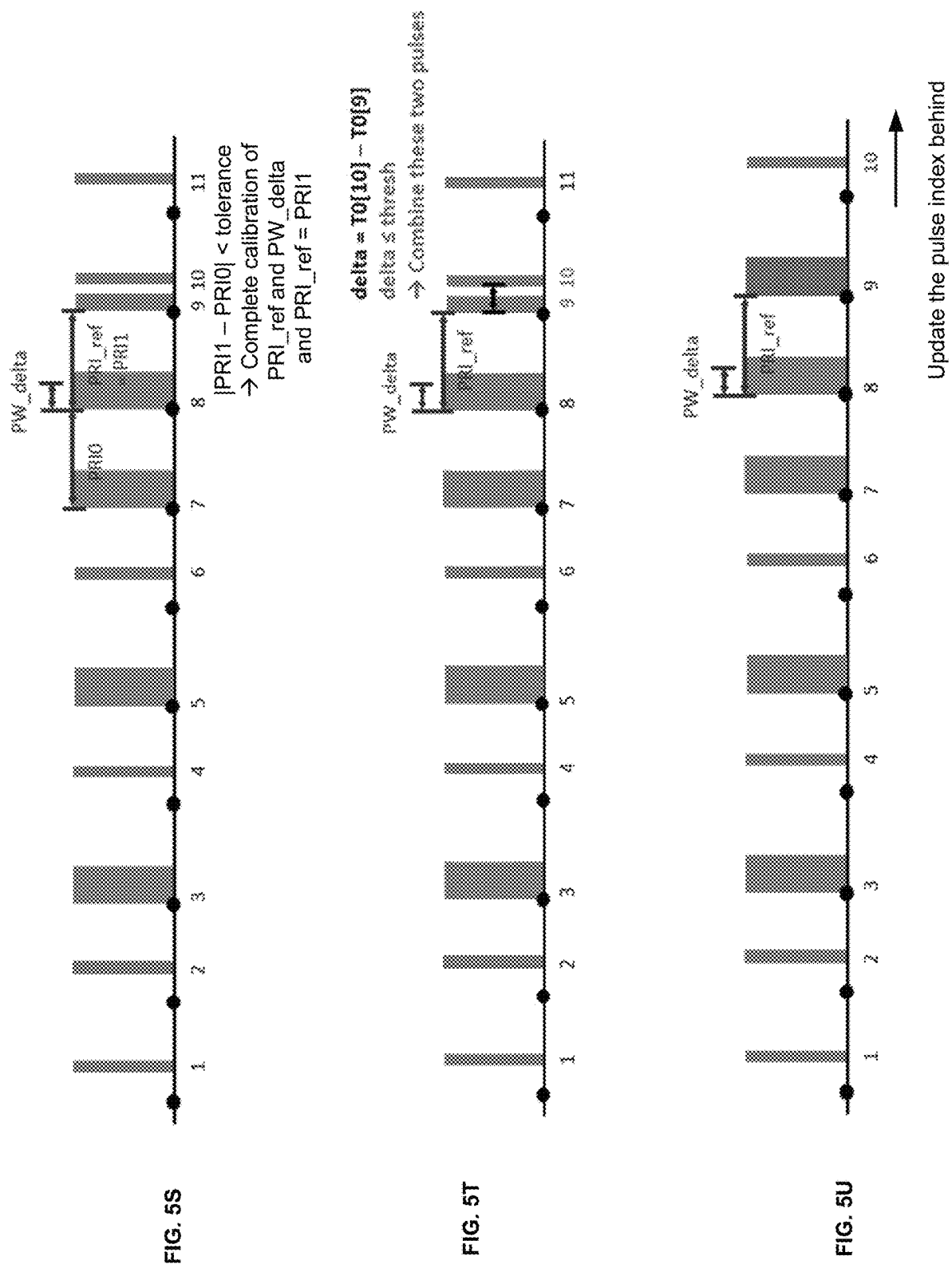

Data read from FIFO

1st stage: Pulse Interval Calibration

T0[2] − T0[1] > threshold

Default put 1st pulse into 5-length sliding window
Sliding window: [1st 0 0 0 0] pulse 1st stage: Pulse Interval Calibration Record 2nd pulse into 5-length sliding window
Sliding window: [1st 2nd 0 0 0] pulse

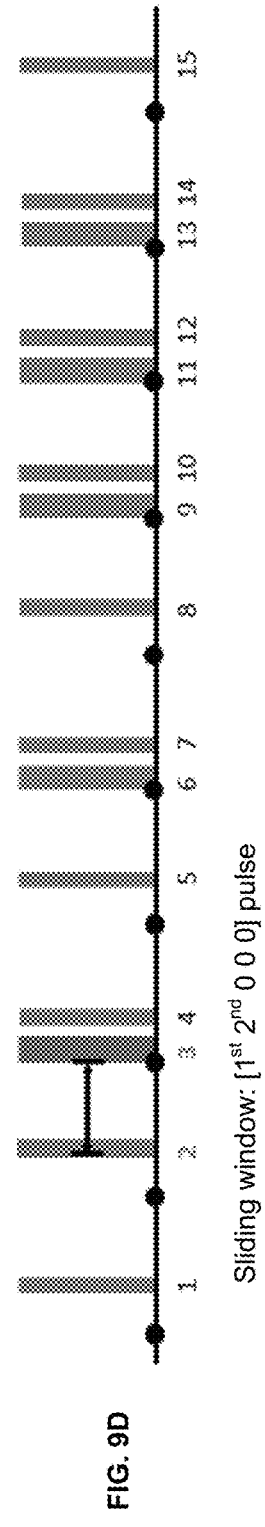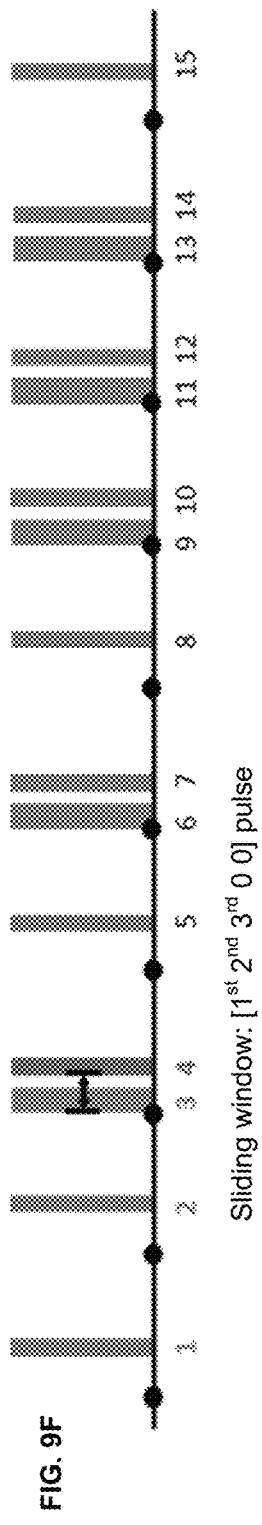

1st stage: Pulse Interval Calibration

T0[5] − T0[3] > threshold

Sliding window: [1st 2nd 3rd 0 0] pulse

Record 5th pulse into 5-length sliding window
Sliding window: [1st 2nd 3rd 5th 0] pulse

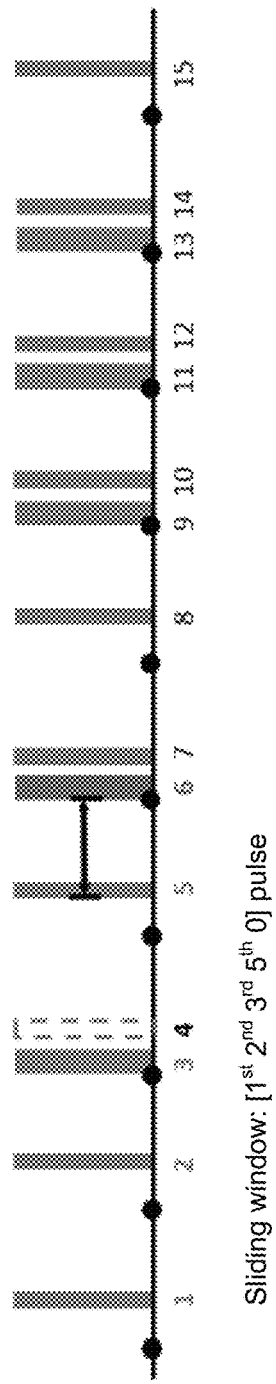

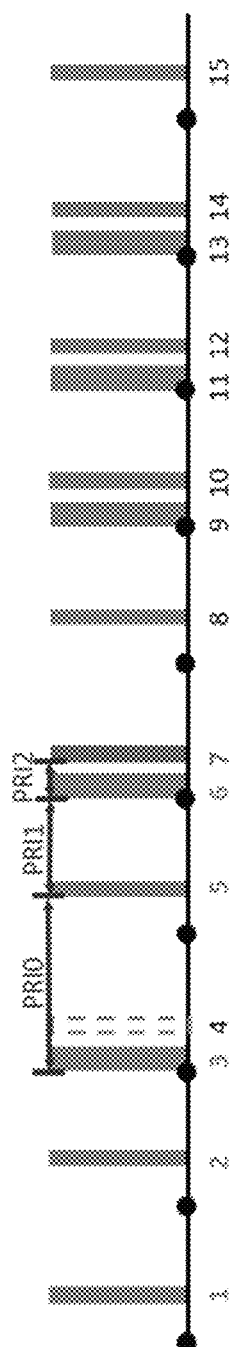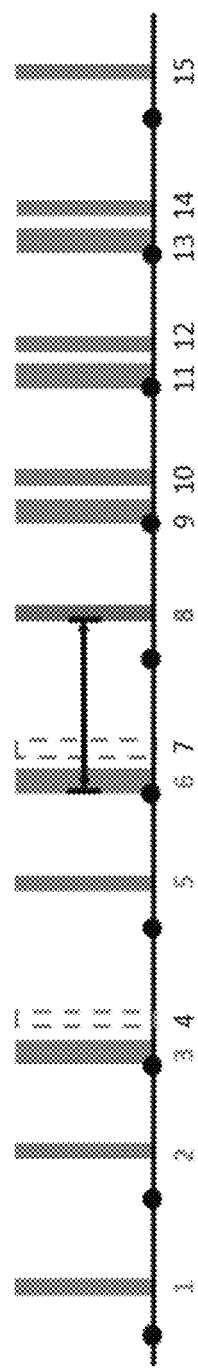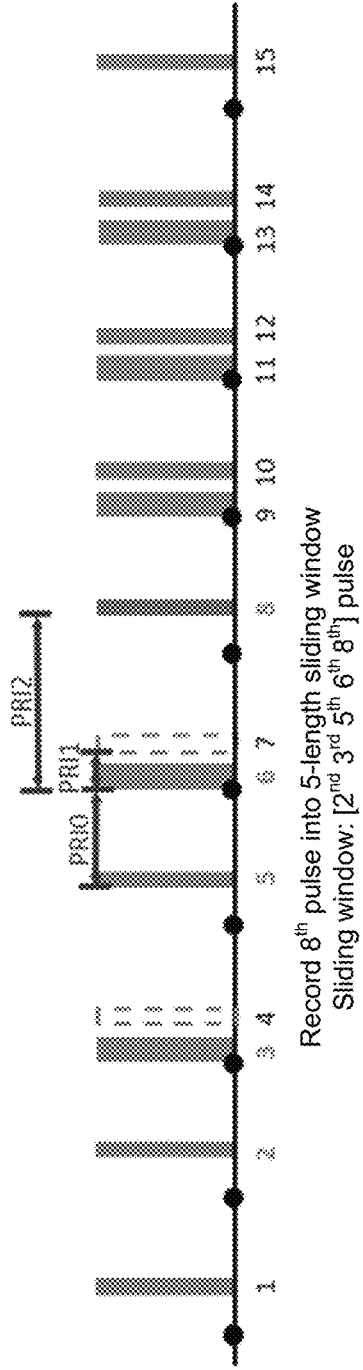

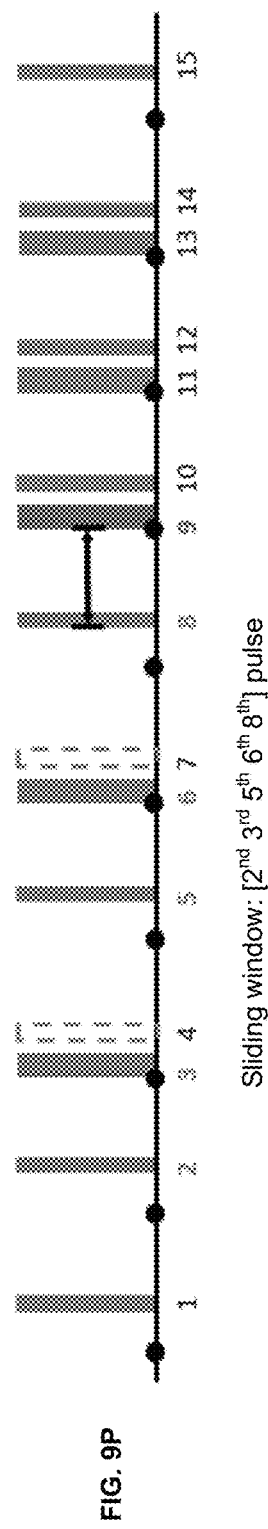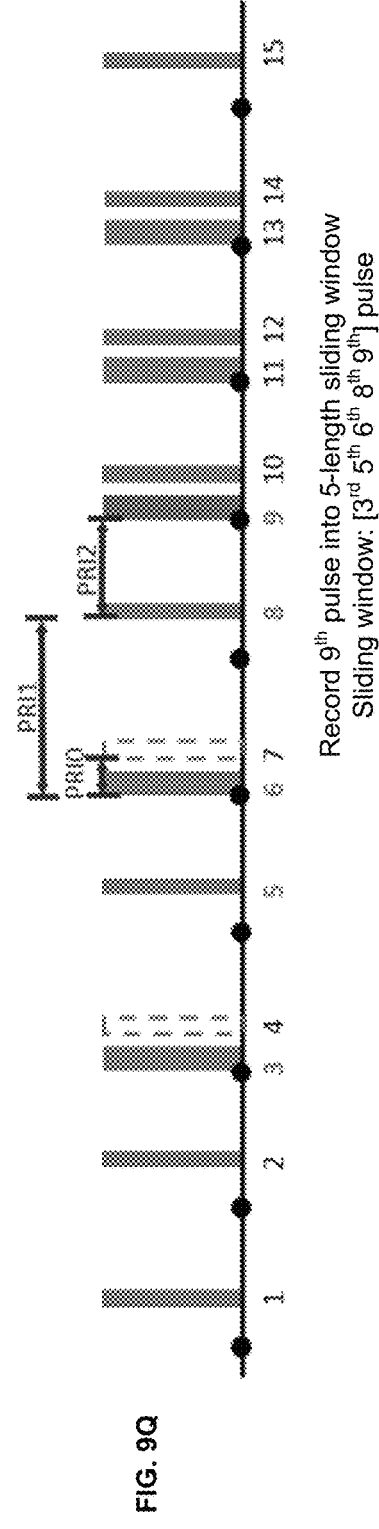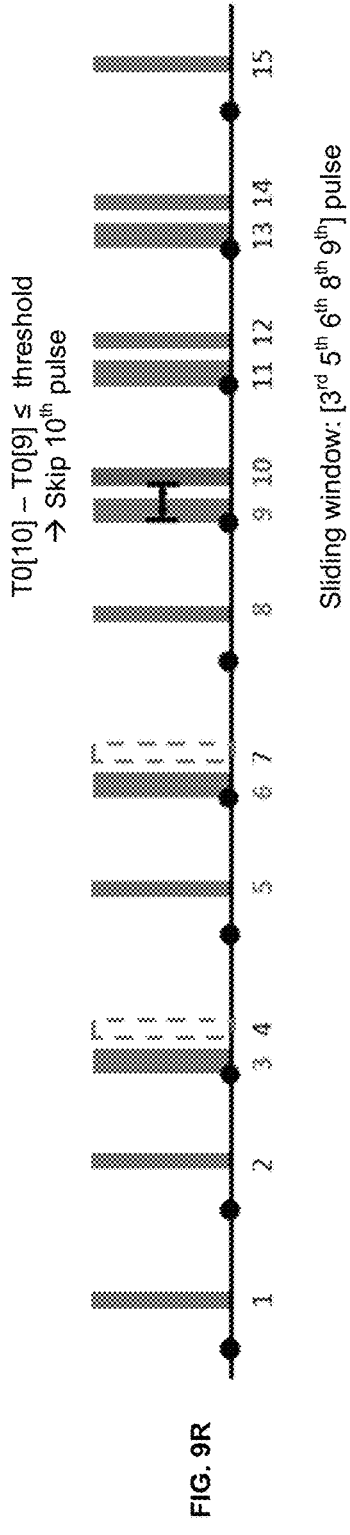

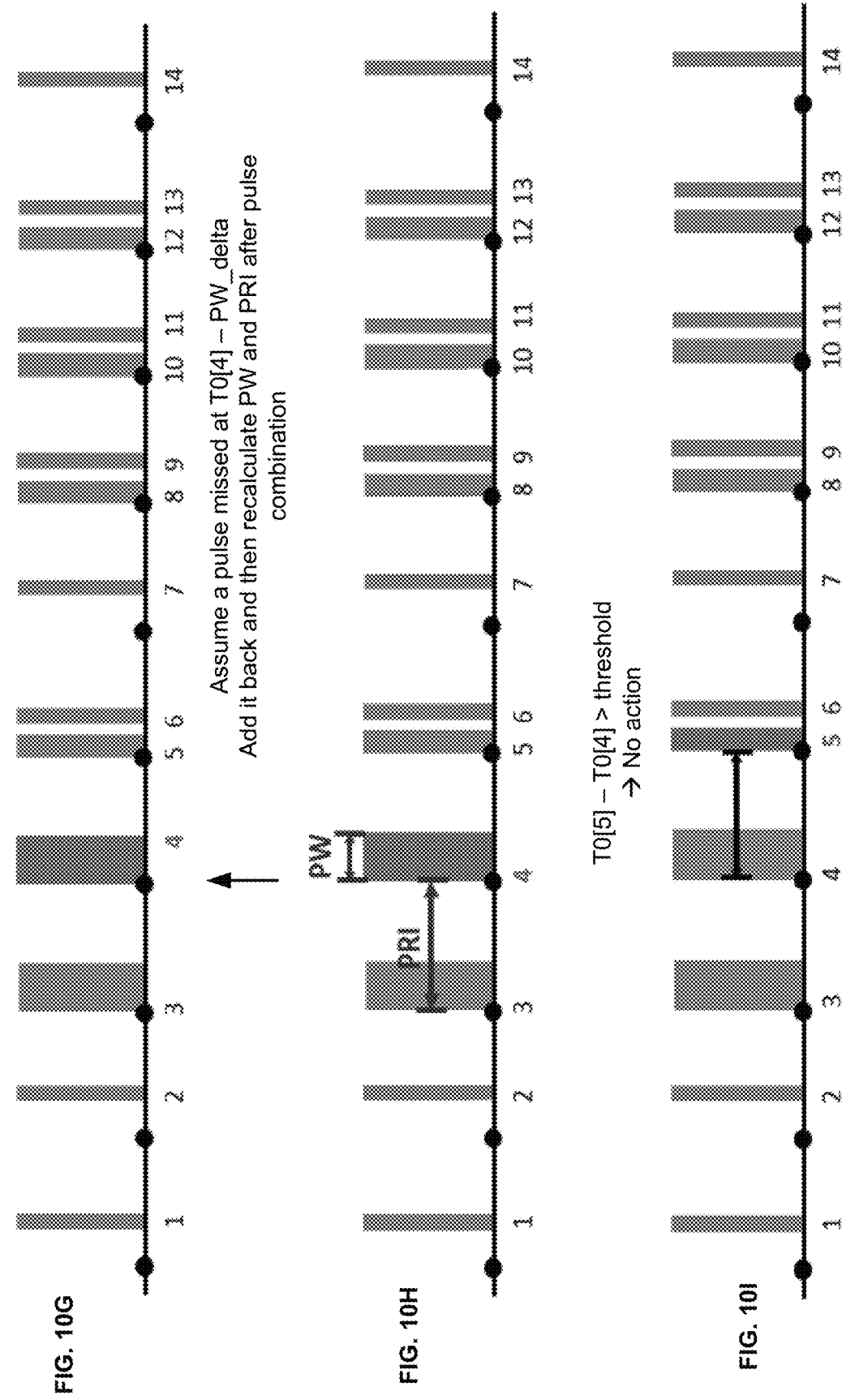

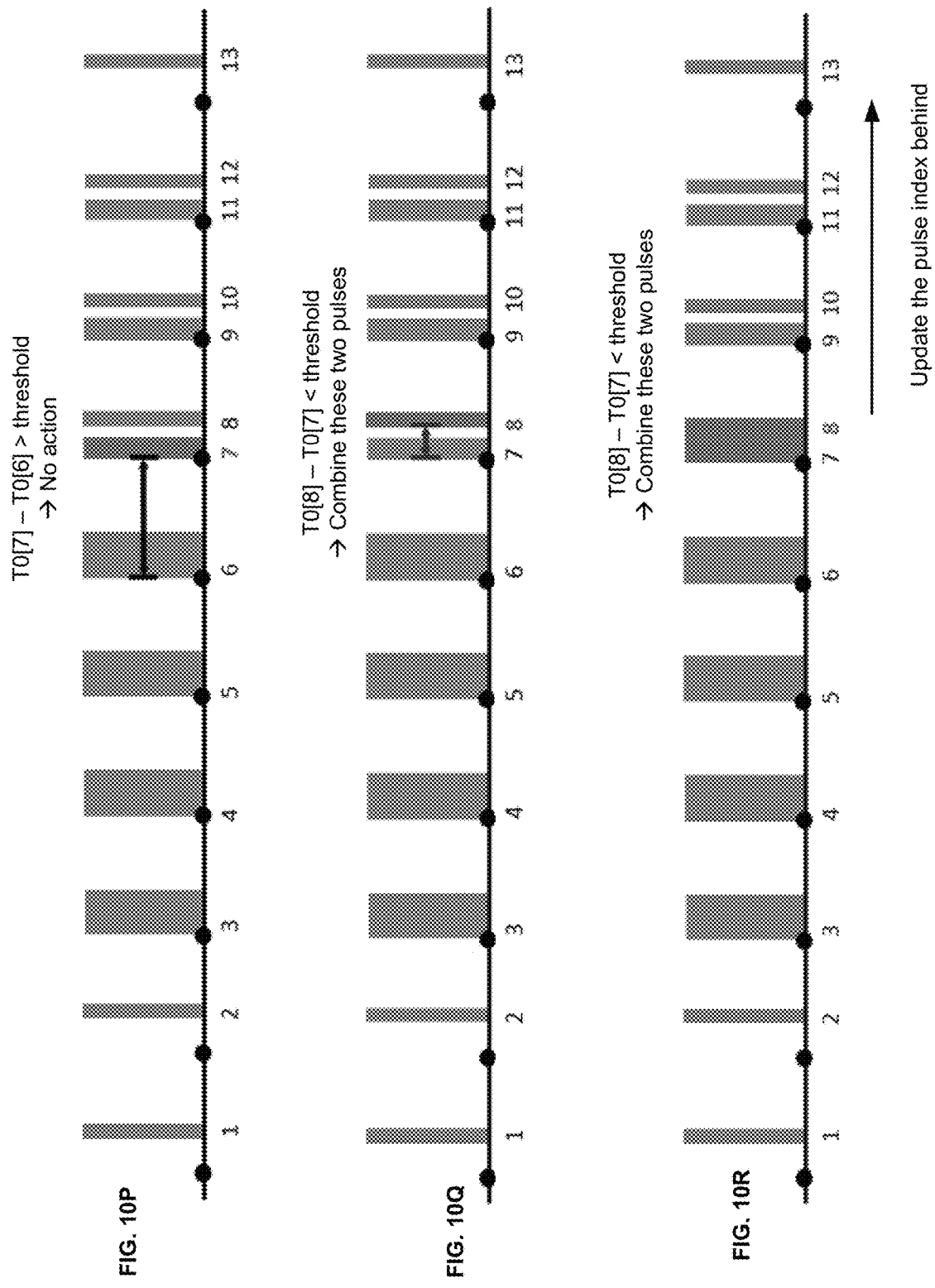

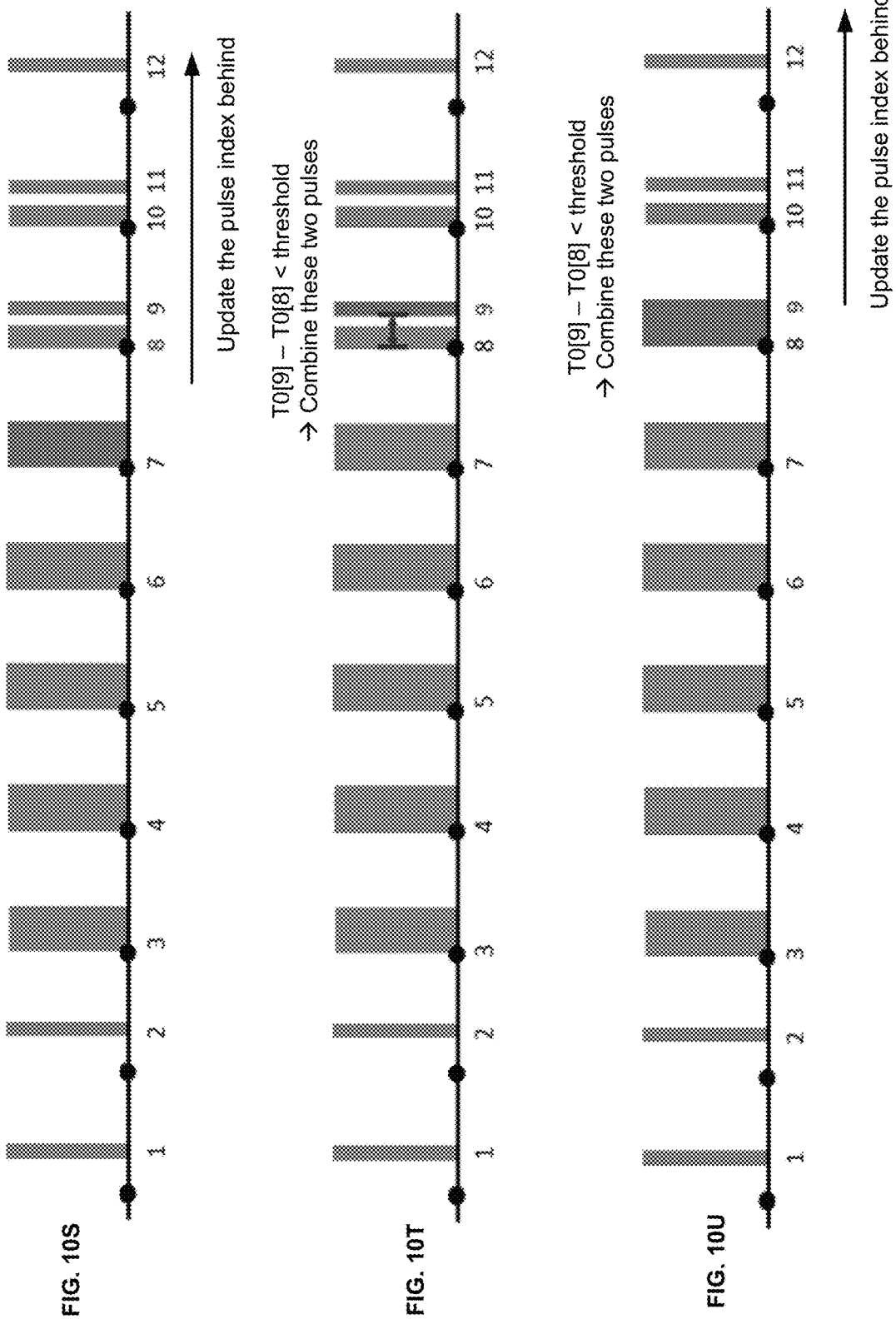

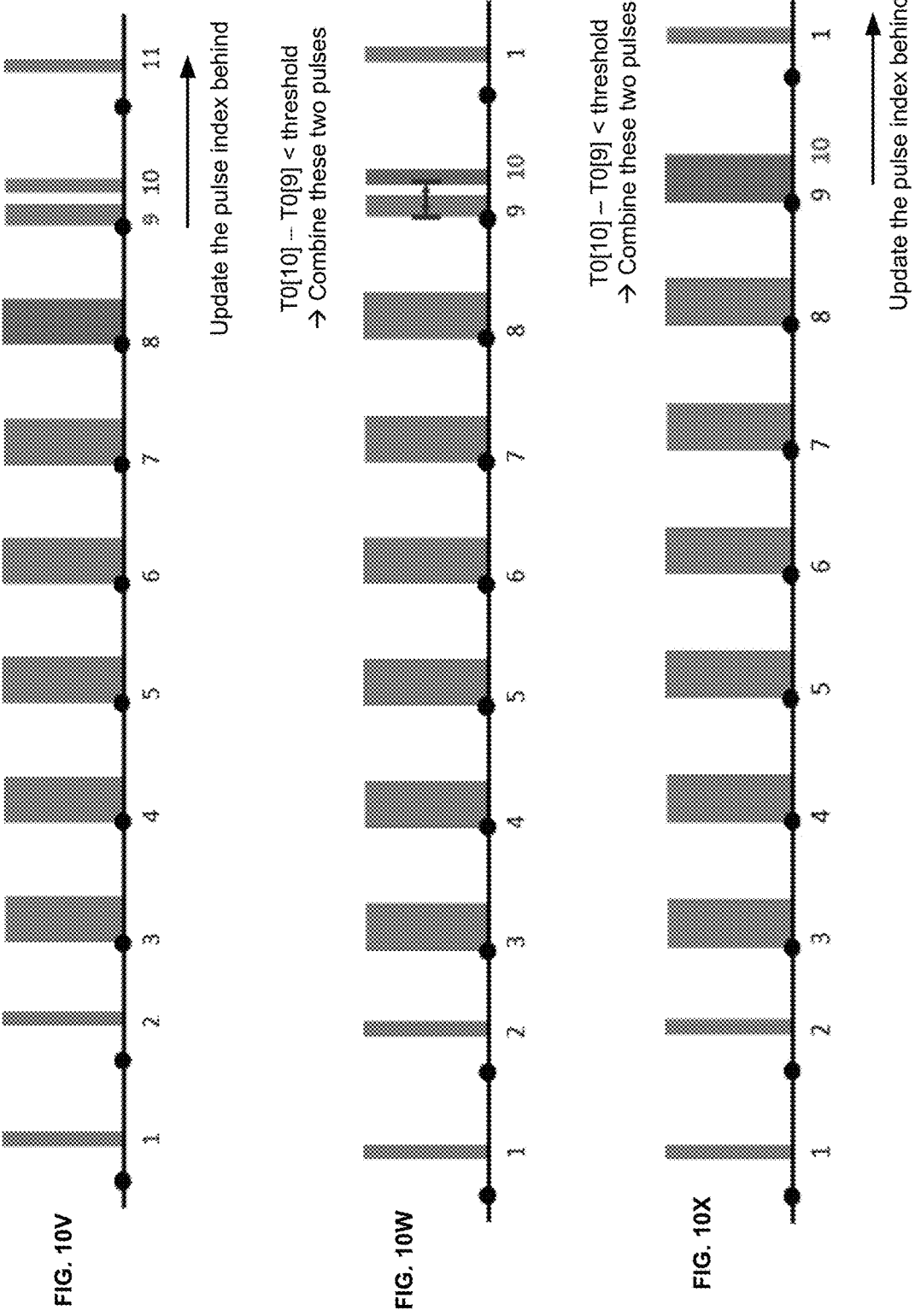

$2^{nd}$ stage: Pulse combination and PRI/PW correction

2nd stage: Pulse combination and PRI/PW correction

Assume a pulse missed at T0[10] – PW_delta
Add it back and then recalculate PW and PRI after pulse combination

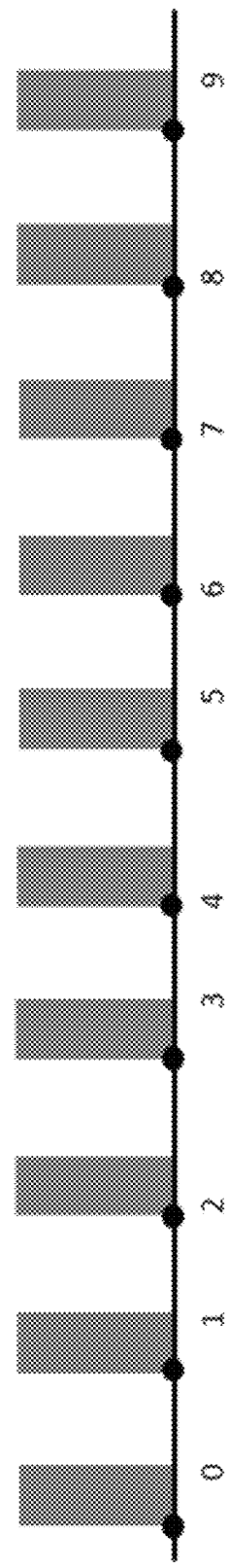
FIG. 11C  Original radar waveform
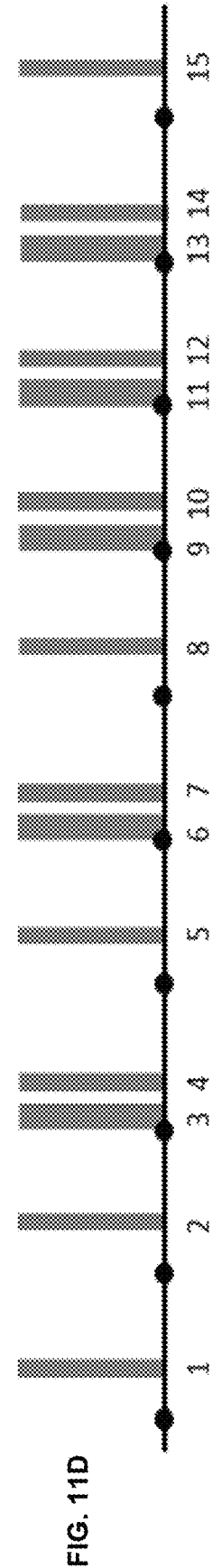
FIG. 11D  With channel and filter effect
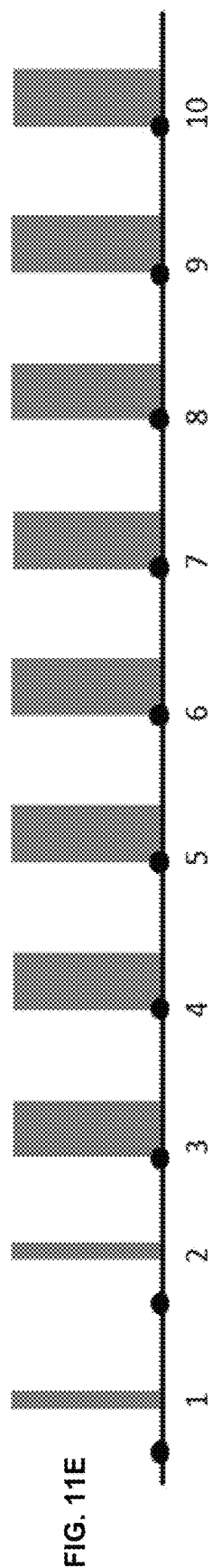
FIG. 11E  After applying PRI/PW correction

RADAR DETECTION IN A WIRELESS LAN

CROSS REFERENCE TO RELATED APPLICATION

This application is a continuation application of U.S. Non-Provisional application Ser. No. 16/896,876, filed on Jun. 9, 2020, which claims the benefit of U.S. Provisional Application No. 62/899,481 filed on Sep. 12, 2019 and U.S. Provisional Application No. 62/927,760 filed on Oct. 30, 2019, the disclosures of which are incorporated herein by reference in their entireties.

TECHNICAL FIELD

The subject technology generally relates to wireless local area network (WLAN) systems, and more particularly, to systems and methods for devices that operate in WLAN dynamic frequency selection (DFS) channels to improve the detection of co-existing radar signals.

BACKGROUND

WLAN systems complying with the IEEE 802.11 standard may operate in the 2.4 GHz, 5 GHz, or higher frequency bands. Channels in the 5 GHz band are classified based on their allowed usage as indoor or outdoor channels. WLAN outdoor channels in the 5 GHz band are increasingly being used in automobiles for in-vehicle networking as well as to exchange information with other automobiles and to receive information from system infrastructure to aid autonomous driving and other applications. In some countries, some if not all of the WLAN outdoor 5 GHz channels are also used by radars, e.g., weather, military, and civilian radars. These 5 GHz channels where WLAN and radar operations coexist are referred to as dynamic frequency selection (DFS) channels. Because radars have priority over WLAN devices in the usage of the DFS channels, WLAN devices need to identify the existence of radar signals on the shared operating frequency, and to guide themselves or other devices away from the radars' operating frequency.

To minimize interference by WLAN devices on radars, regulatory authorities in many jurisdictions impose stringent requirements on the capability of WLAN devices to detect radar signals on the DFS channels. For example, FCC in US, ETSI in Europe, and MIC in Japan require WLAN devices to be able to identify signals of specified radar types under various signal conditions before the WLAN devices are cleared to operate in these jurisdictions and also while the WLAN devices are already operating on the DFS channels. Radar signals are transmitted in bursts of uniform pulses characterized by a pulse width (PW) for the duration of each pulse and a pulse repetition interval (PRI) for the period between successive pulses. WLAN devices may declare radar detection by determining if the number of successive pulses with uniform PW and PRI detected by a radar detect module passes a specified threshold.

To reduce complexity, chip size, power consumption and cost, WLAN module and radar detect module of a WLAN transceiver may share receiver (Rx) blocks such as radio frequency (RF) modules and DC notch filter. Filtering effects from a shared Rx low power filter (LPF) at band-edge, a DC notch filter at center frequency, and others such as a spur notch filter may cause the PW of received radar signals to be broken into multiple smaller pulses. Channel effects of the DFS channels may similarly impair the received radar signals. These multiple smaller pulses may shorten the PW and PRI of the detected radar signals. The radar detect module may not be able to match the shortened PW and PRI of the detected radar pulses with the recognized PW and PRI of specified radars, and thus may fail to recognize the signals as radar signals.

To compensate for the channel and filtering effects, software running in the radar detect module may attempt to combine the broken radar pulses to reconstruct the original PW. For example, if the smaller pulses are within a certain range and if the interval between consecutive pulses is less than a threshold, the pulses may be considered as part of the same pulse. However, channel and filtering effects cause variations in the received power of radar pulses in addition to changed PW and PRI. A pulse may be broken into multiple pulses of various power levels. In one scenario, a pulse may be filtered into a first partial pulse of reduced power level followed by a second partial pulse of greater power level. If only the greater power level of the second partial pulse exceeds a detection threshold, the pulse may be detected as a narrower PW than the original pulse and as shifted in time from the start of the original pulse. Software that attempts to combine closely spaced detected radar pulses to reconstruct the original pulse is ineffective when operating on a delayed, narrower single pulse of the original pulse. The PW and PRI of the detected radar signals may then be different from those of the transmitted radar signals, leading to decreased probability of radar detection, increased interference to radar operation, degraded performance of the WLAN devices, or denial of regulatory approval to operate the WLAN devices.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 3A-3C illustrate an example technique to correct the PW and the PRI of radar pulses that have been impaired due to channel and filtering effects based on calibrated results of the expected PRI and the time delay between partial pulses of original pulses, in accordance with some embodiments of the present disclosure.

FIGS. 11A-11D illustrate the results of a second sequence of operations to apply, and FIG. 11E illustrates the results after applying, the pulse combination and PRI/PW correction stage of the second method to a burst of received radar pulses that have been impaired due to channel and filtering effects to correct the PRI and PW of the impaired pulses, in accordance with some embodiments of the present disclosure.

DETAILED DESCRIPTION

Figure 1:
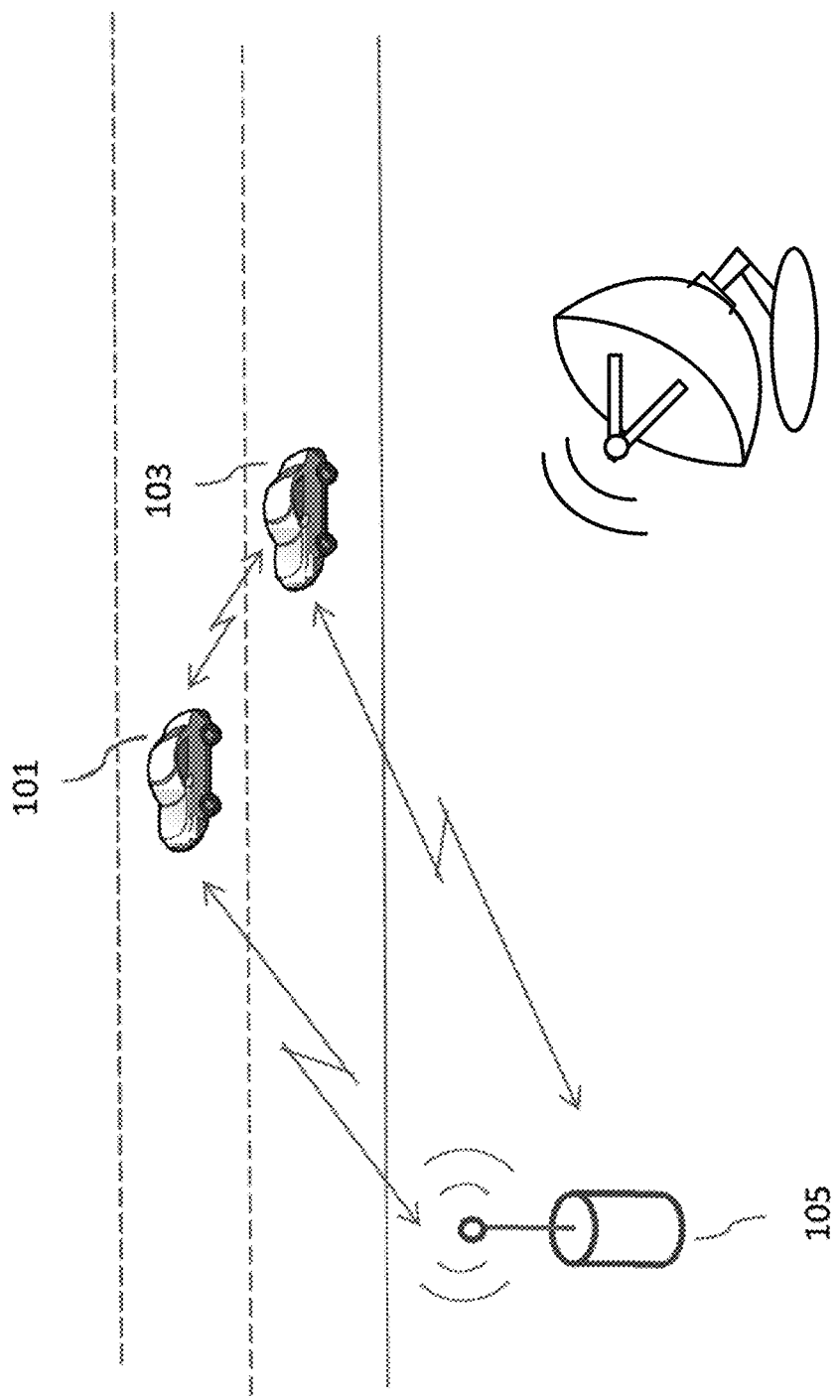
FIG. 1 illustrates an example outdoor wireless local area network (WLAN) architecture deployed for automobiles that operate in WLAN dynamic frequency selection (DFS) channels shared with a radar, in accordance with some embodiments of the present disclosure.

Examples of various aspects and variations of the subject technology are described herein and illustrated in the accompanying drawings. The following description is not intended to limit the invention to these embodiments, but rather to enable a person skilled in the art to make and use this invention.

Radars transmit bursts of periodic pulses that are characterized by a uniform pulse width (PW) and a pulse repetition interval (PRI) for the period between the pulses specific to the radar types. Radar pulses received by WLAN devices may be broken into multiple smaller or partial pulses due to channel and filtering effects, shortening the PW and changing the PRI of the original radar transmission. In one aspect of the subject technology, a WLAN device operating on DFS channels of 5 GHz band estimates or calibrates the PRI as well as delays between the partial pulses by processing received pulses that are impaired. The calibrated PRI may approximate the PRI of the transmitted pulses. The calibrated delay between the partial pulses estimates the interval between two partial pulses that originally belong to the same transmitted pulse. Using the calibrated PRI and the calibrated delay between partial pulses, the WLAN device may reconstruct the original pulses from received impaired pulses even when the impaired pulses are delayed and partial pulses of the original pulses. The WLAN device may use the calibrated results to correct the shortened PW and varying PRI of the impaired pulses to restore the partial pulses to their full PW with a relatively uniform PRI. The pulse calibration and pulse correction operations increase the probability of the WLAN device correctly detecting the radar signals. The WLAN device may quickly and reliably switch to another supported WLAN channel that may be a DFS channel or a non-DFS channel to steer free of DFS channels carrying the radar signals, thereby reducing interference on the radar signals and improving the performance of the WLAN device.

In one embodiment, during the pulse calibration phase, the WLAN device may compare the delay between two consecutive received pulses with a threshold. In one embodiment, the threshold may be a predefined threshold. If the delay between the two consecutive pulses is less than or equal to the threshold, the WLAN may estimate the delay between partial pulses, also referred to as PW_delta, to be the delay. If the delay between the two consecutive pulses is greater than the threshold, the WLAN may estimate the PRI of the radar pulses, also referred to as PRI_ref, to be the delay. The WLAN may complete the calibration when successive estimates of the PRI_ref and PW_delta converge within a tolerance value.

In one embodiment, during the pulse correction phase, the WLAN device may compare the delay between a current pulse and an immediately preceding pulse with the sum of the PRI_ref and the PW_delta. If the delay between the two consecutive pulses is equal to the sum of PRI_ref and PW_delta to within a tolerance, the WLAN device may assume there is a missing pulse that should have been detected at PW_delta before the current pulse. The current pulse is assumed to be a partial pulse that is delayed by PW_delta from the position of the missing pulse. The WLAN device may add a pulse PW_delta before the current pulse and may combine the added pulse with the current pulse to reconstruct a pulse with a PW that is a sum of PW_delta and the PW of the current pulse.

In one embodiment of a method for calibrating PRI_ref and PW_delta and for using the calibrated PRI_ref and PW_delta to correct the impaired pulses to reconstruct the original pulses, the calibration operation and the correction operation may process through stored radar pulses using a single pass. The WLAN device may process the stored radar pulses until calibration of the PRI_ref and PW_delta is complete. Once the calibration operation is complete, the WLAN device may correct the stored radar pulses that follow to reconstruct the original pulses. The WLAN device thus only corrects the subset of the stored radar pulses that follow the stored radar pulses used for the calibration operation.

In another embodiment, the method may process stored radar pulses to calibrate the PRI_ref and PW_delta in a first of two passes through the stored radar pulses. During the first pass pulse calibration stage, the WLAN device may generate a sliding window of consecutive pairs of pulses that are each separated by at least a threshold. In one embodiment, the threshold may be a predefined threshold. In one embodiment, the sliding window may be a 5-length sliding window of 5 pulses. The WLAN device may search for a 5-length sliding window that contains two consecutive pulses that are separated by at least the threshold, but with each of the two consecutive pulses broken into two partial pulses. The WLAN device may estimate or calibrate the PRI_ref to be the delay between the two consecutive pulses and may estimate or calibrate the PW_delta to be the delay between the two partial pulses broken from one of the two pulses. The WLAN device may verify the calibrated PRI_ref and the PW_delta using the pulses in the 5-length sliding window. For example, the WLAN device may determine if 3 consecutive pulses of the 5-length sliding window are separated by delays that match the calibrated PRI_ref and PW_delta to within a tolerance. The 5-length sliding window contains 3 different combinations of 3 consecutive pulses. Calibration is complete when all 3 combinations of the 3 consecutive pulses are successfully verified using the calibrated PRI_ref and PW_delta.

The method may correct the stored radar pulses using the calibrated PRI_ref and PW_delta in a second pass through the stored radar pulses. During the second pass pulse correction stage, the WLAN device may compare the delay between a current pulse and an immediately preceding pulse with a threshold. In one embodiment, the threshold may be a predefined threshold. If the delay between the two consecutive pulses is less than or equal to the threshold, the two consecutive pulses may be assumed as two partial pulses broken from a transmitted pulse. WLAN device may combine the two consecutive pulses to reconstruct the transmitted pulse with a PW that is a sum of the PW of the current pulse and the delay.

FIG. 1 illustrates an example outdoor WLAN architecture deployed for automobiles, in accordance with some embodiments of the present disclosure. WLAN devices may be deployed in automobiles 101 and 103 to communicate using the IEEE 802.11 standard. The WLAN devices may be user stations (STAs) configured to associate with an access point (AP) 105 deployed by the road when the automobiles 101 and 103 come within a range of the AP 105. The WLAN devices in automobiles 101 and 103 and the AP 105 may form a basic service set (BSS). Once associated with the AP 105, the WLAN devices may receive information such as road condition, traffic condition, environmental and other infrastructure information from the AP 105 to assist the automobiles 101 and 103 in navigating the road. In one scenario, the automobiles 101 and 103 may exchange vehicle information such as speed, heading, etc., in peer-to-peer communication using the WLAN devices without routing the data traffic through the AP 105. The automobiles 101 or 103 may use the information received from one another, and/or from the AP 105 to facilitate autonomous driving. In another scenario, the automobile 101 may host a SoftAP or a Peer-to-Peer Group Owner (P2P GO) to which in-vehicle WLAN clients (e.g., mobile phones with WLAN capability carried by passengers or in-vehicle entertainment consoles of passenger seats) inside the automobile 101 may connect to, through which infotainment contents may be exchanged.

The WLAN system may operate on one or more 5 GHz WLAN DFS channels shared with radar systems. The AP 105 or the WLAN device in automobiles 101 or 103 may be a WLAN DFS master device configured to detect the presence of radar signals in an operating channel and may guide itself and connected slave devices without the radar detection capability away from the operating channel if radar interference is detected. The WLAN DFS master device may be required by regulation to perform radar scan, or a DFS-channel availability check (DFS-CAC) scan for a minimum period of time to ensure a DFS channel is free from radar interference before the WLAN DFS master device may start operating in the channel. During operation after the DFS-CAC is clear, the WLAN DFS master device may still be required to constantly monitor for any radar signals in the operating channel using in-service monitoring (ISM). If a radar signal is detected anytime during the CAC or ISM in a DFS channel, the WLAN DFS master device and the connected slave devices are expected to quickly move away to a different channel.

Examples, implementations, and embodiments described herein are primarily described in the context of a WLAN. In one embodiment, the WLAN system may be a WLAN network using various versions of the IEEE 802.11 standard. However, other WLAN system may be contemplated.

Figure 2B:
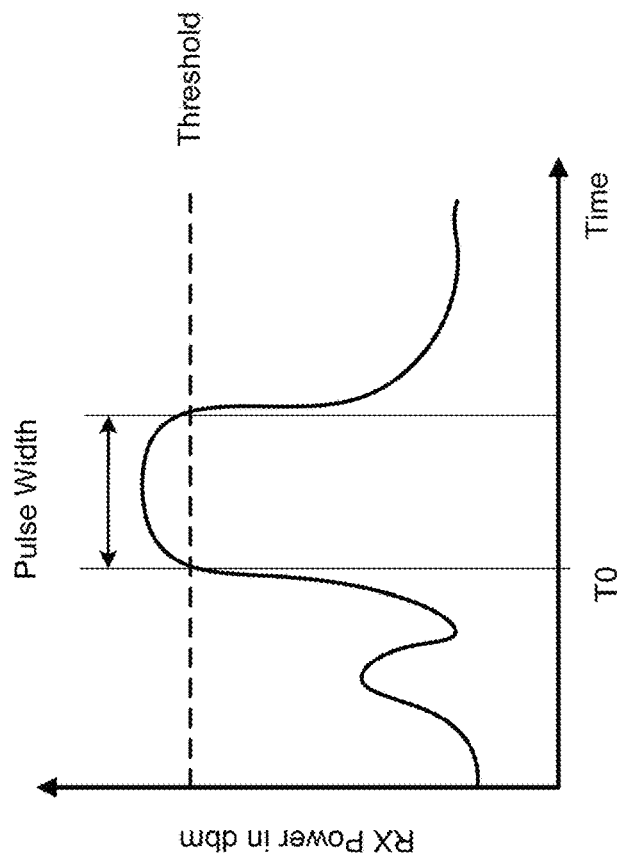
FIGS. 2A-2B illustrate the channel and filtering effects on a radar pulse showing variations in the received power level and pulse width of the pulse, in accordance with some embodiments of the present disclosure.
Figure 2A:
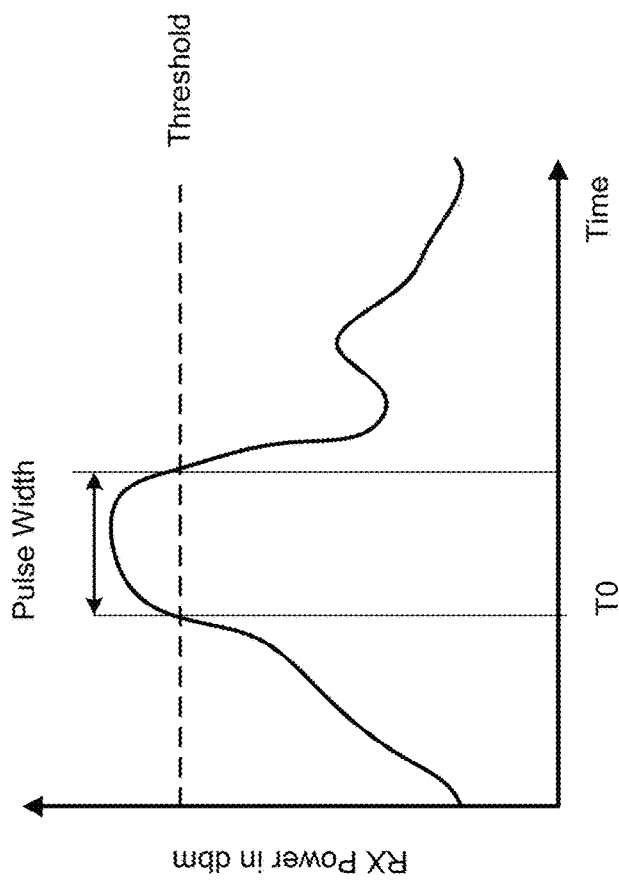

FIGS. 2A-2B illustrate the channel and filtering effects on a radar pulse showing variations in the received power level and pulse width of the pulse, in accordance with some embodiments of the present disclosure. In FIG. 2A, a transmitted pulse is broken into an earlier partial pulse of higher power level and a latter partial pulse of reduced power level due to the channel and filtering effects when the transmitted pulse is received by a WLAN device. The higher power level of the earlier partial pulse exceeds a detection threshold, resulting in the detection of the earlier partial pulse with a timestamp of T0. In contrast, the reduced power level of the latter partial pulse does not exceed the detection threshold and the latter partial pulse is not detected. The result is a received pulse that starts at the expected detection time of the transmitted pulse but with a narrower PW than the transmitted pulse.

In FIG. 2B, the opposite scenario from FIG. 2A is observed. A transmitted pulse is broken into an earlier partial pulse of reduced power level and a latter partial pulse of higher power level when the transmitted pulse is received by a WLAN device. The higher power level of the latter partial pulse exceeds the detection threshold, in contrast to the reduced power level of the earlier partial pulse. The result is a received pulse that is delayed from the expected detection time of the transmitted pulse but again with a narrower PW than the transmitted pulse. The PW and PRI of the detected radar pulses may then be different from the PW and PRI of the transmitted pulses, leading to decreased probability of radar detection if the detected pulses are not corrected.

FIGS. 3A-3C illustrate an example technique to correct the PW and the PRI of radar pulses that have been impaired due to channel and filtering effects based on calibrated results of the expected PRI and the time delay between partial pulses of original pulses, in accordance with some embodiments of the present disclosure. The calibrated PRI may represent the estimated PRI of the original radar pulses and will be referred to as PRI_ref. The calibrated delay between partial pulses of original pulses may represent the estimated delay in the starting time of two partial pulses of an original full pulse such as the partial pulses shown in FIGS. 2A-2B and will be referred to as PW_delta. Methods to calibrate PRI_ref and PW_delta from received impaired radar pulses will be described.

In FIG. 3A, a first full pulse is designated with pulse index (i−1). The full PW of pulse[i−1] is designated as PW[i−1] and the starting timestamp of pulse [i−1] is designated as T0[i−1]. A second partial pulse is designated with pulse index i. The partial PW of pulse[i] is designated as PW[i] and the starting timestamp of pulse [i] is designated as T0[i]. Pulse[i] may be the delayed partial pulse of a second full pulse that should have been received with a period of PRI_ref from T0[i−1]. Pulse[i] may be delayed from the starting timestamp of the missing second full pulse by PW_delta. An example of pulse [i] is illustrated by FIG. 2B. A technique to detect the missing second full pulse is to determine if the delay, designated as PRI[i−1], between the starting timestamps of pulse[i] and pulse[i−1] is equal to the sum of PRI_ref and PW_delta to within a tolerance. If this condition is true, the technique may assume that the full pulse of pulse[i] should have been received starting at PW_delta before T0[i]

FIG. 3B shows the missing full pulse of pulse[i] may start at (T0[i]−PW_delta) or at about PRI_ref from T0[i−1]. The technique may add an earlier partial pulse of the missing second full pulse starting at (T0[i]−PW_delta). The added earlier partial pulse and pulse[i] are considered the two partial pulses of the second full pulse.

FIG. 3C shows that the technique may combine the added earlier partial pulse and the detected latter partial pulse[i] to reconstruct the second full pulse. The PW of the reconstructed second full pulse may be the sum of PW_delta and PW[i]. The starting timestamp of the reconstructed second full pulse may be the sum of PRI_ref and T0[i−1]. The reconstructed second full pulse restores the detected partial pulse[i] to its full PW with the expected PRI between pulse[i−1] and pulse[i], thus enabling the radar detect module to identify the radar signal.

Figure 4:
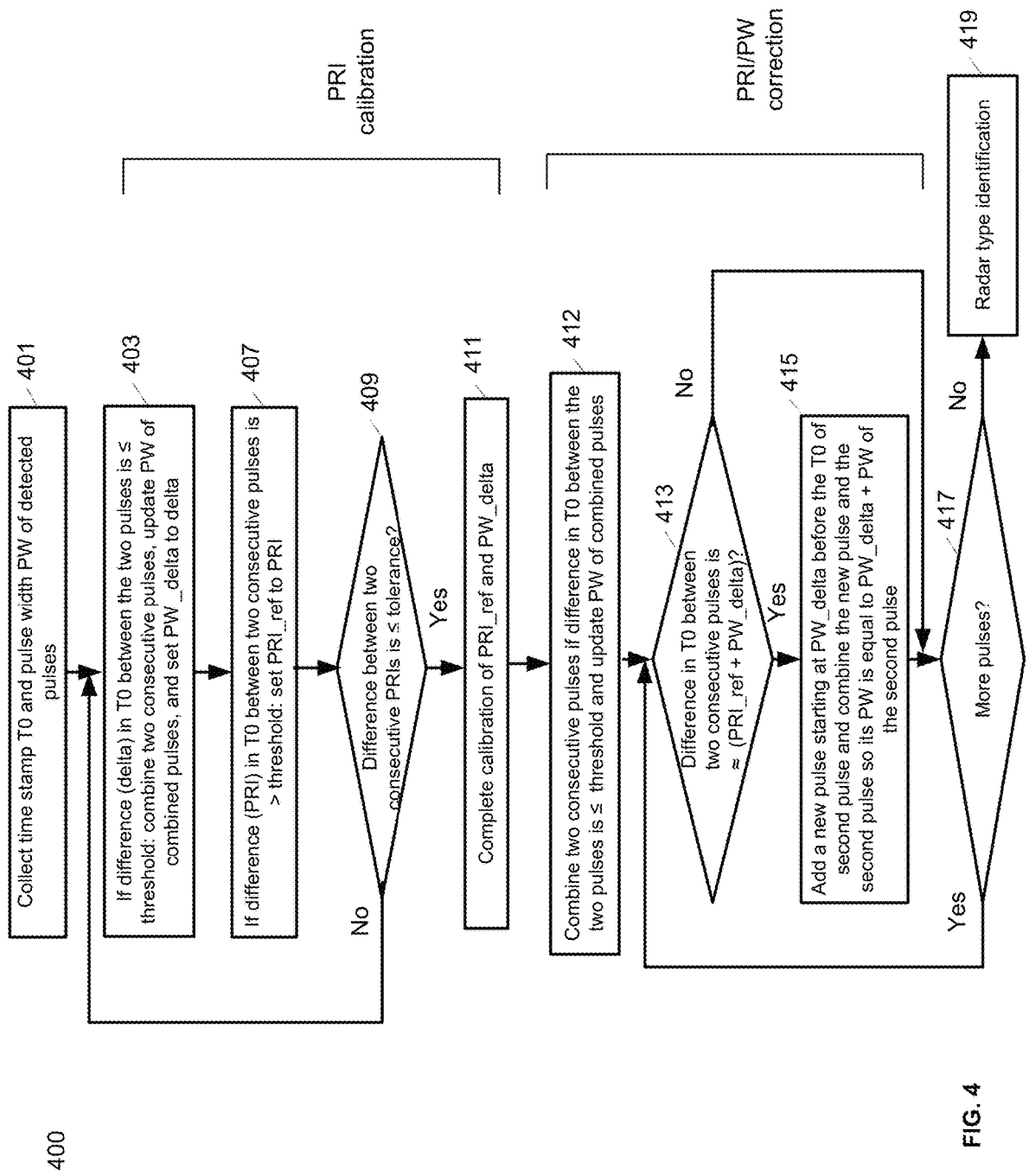
FIG. 4 illustrates a flow diagram of a first method for a WLAN device to calibrate the PRI and the delays between partial pulses of original radar pulses, and to use the calibrated results to correct the PRI and PW of the impaired radar pulses, in accordance with some embodiments of the present disclosure.

FIG. 4 illustrates a flow diagram of a first method 400 for a WLAN device to calibrate the PRI_ref and the PW_delta, and to use the calibrated results to correct the PRI and PW of the impaired radar pulses, in accordance with some embodiments of the present disclosure. The method 400 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by a WLAN DFS master device or a processing device included in a WLAN device.

Method 400 performs the pulse calibration operation and the pulse correction operation by processing stored radar pulses using a single pass. Method 400 may process the stored radar pulses until calibration of the PRI_ref and PW_delta is complete. Once the pulse calibration operation is complete, method 400 may correct the stored radar pulses that follow to reconstruct the original pulses. Method 400 thus only corrects the subset of the stored radar pulses that follow the stored radar pulses used for the calibration operation.

At operation 401, the method collects the timestamp T0 and pulse width PW of detected pulses. The timestamp T0 of a pulse may be the state of an internal clock of the WLAN device when the power of the received pulse first crosses a detection threshold. The PW of a pulse may be the difference in the timestamp T0 and a timestamp when the received power of the pulse falls below the detection threshold. In one embodiment, T0 and PW of pulses detected by the WLAN may be written into a FIFO. Software or firmware may read the FIFO to retrieve the T0 and PW of the pulses to calibrate the PRI_ref and the PW_delta of the pulses, and to use the calibrated results to correct the PRI and PW of the pulses.

At operation 403, the method may compare the difference between the T0 of a current pulse and the T0 of an immediately preceding pulse with a threshold. In one embodiment, the threshold may be a predefined threshold. If the delay between the current pulse and the immediately preceding pulse is less than or equal to the threshold, the two consecutive pulses may be assumed as two partial pulses of a full transmitted pulse. The method may combine the two consecutive pulses to reconstruct the transmitted pulse with a PW that is a sum of the PW of the current pulse and the delay between the current pulse and the immediately preceding pulse. The method may estimate PW_delta to be the delay between the current pulse and the immediately preceding pulse.

At operation 407, if the delay between the current pulse and the immediately preceding pulse is greater than the threshold, the two consecutive pulses are likely separated by PRI. The method may estimate PRI_ref to be the delay between the current pulse and the immediately preceding pulse.

At operation 409, the method determines if the PRI, designated PRI1, between the current pulse and the immediately preceding pulse matches an earlier PRI, designated PRI0, calculated between two immediately preceding pulses to the current pulse. In one embodiment, if PRI1 and PRI0 are non-zero, and the difference between PRI1 and PRI0 is within a tolerance value, the estimated PRI_ref is considered to have converged.

At operation 411, if the estimated PRI_ref has converged and the estimated PW_delta is non-zero, the method declares that calibration of PRI_ref and PW_delta is complete. Operations 403, 407, 409, and 411 are classified as operations of the PRI calibration phase of the method. If the estimated PRI_ref has not converged or if the estimated PW_delta is zero, the method may read the T0 and PW of the next pulse from the FIFO and may repeat the PRI calibration phase using the next pulse as the new current pulse until convergence of PRI_ref and non-zero PW_delta is achieved. After completion of the PRI calibration phase, the method may use the calibrated PRI_ref and PW_delta to correct the impaired pulses that follow to reconstruct the original pulses. The method thus may only correct the subset of the impaired pulses that follow the impaired pulses used for the PRI calibration phase.

At operation 412, the operation may compare the difference between the T0 of a current pulse and the T0 of an immediately preceding pulse with a threshold. In one embodiment, the threshold may be a predefined threshold. If the delay between the current pulse and the immediately preceding pulse is less than or equal to the threshold, the two consecutive pulses may be assumed as two partial pulses of a full transmitted pulse. The method may combine the two consecutive pulses to reconstruct the transmitted pulse with a PW that is a sum of the PW of the current pulse and the delay between the current pulse and the immediately preceding pulse.

At operation 413, the method may compare the delay between a current pulse and an immediately preceding pulse with the sum of PRI_ref and PW_delta. This operation is illustrated by FIG. 3A as previously discussed. In one embodiment, operation 413 may compare the difference between the T0 of the current pulse and the T0 of the immediately preceding pulse with the sum of PRI_ref and PW_delta.

If the delay between the current pulse and the immediately preceding pulse is equal to the sum of PRI_ref and PW_delta to within a tolerance value, the method may assume there is a missing pulse that should have been detected at PW_delta before the current pulse. The current pulse is assumed to be a partial pulse that is delayed by PW_delta from the position of the missing pulse. At operation 415, the operation may add a pulse PW_delta before T0 of the current pulse and may combine the added pulse with the current pulse to reconstruct a pulse with a PW that is a sum of PW_delta and the PW of the current pulse. The added pulse and the current pulse are considered the two partial pulses of the combined pulse. Operation 415 is illustrated by FIGS. 3B and 3C as previously discussed.

If the comparison of operation 413 is not satisfied or if the added pulse at PW_delta before T0 of the current pulse has been combined with the current pulse to reconstruct the pulse as described in operation 415, at operation 417 the method may check to see if additional impaired pulses from the FIFO are to be processed.

If there are additional impaired pulses to be processed, the method may repeat operations 413 and 415 until all impaired pulses from the FIFO are processed. Operations 412, 413 and 415 are classified as operations of the PRI/PW correction phase of the method.

At operation 419, after the PRI/PW correction phase, the method may perform radar type identification using the reconstructed pulses. In one embodiment, operation 419 may determine if the PRI and PW of the reconstructed pulses match with a specified radar type. Operation 419 may also determine if the number of consecutive pulses with uniform PRI and PW exceeds a threshold. If these conditions are satisfied, detection of the specified radar type is declared. Otherwise, detection of the specified radar type fails and operation 419 may look for a match with an additional radar type until all radar types have been tested.

Figure 5A:
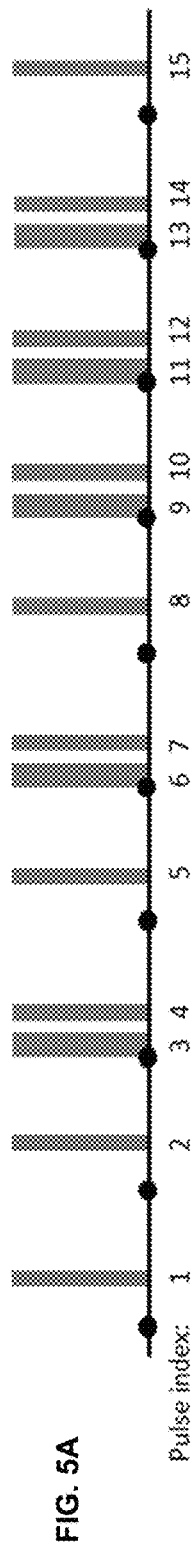
FIGS. 5A-5Y illustrate the results of a sequence of operations when applying.
Figure 5B:
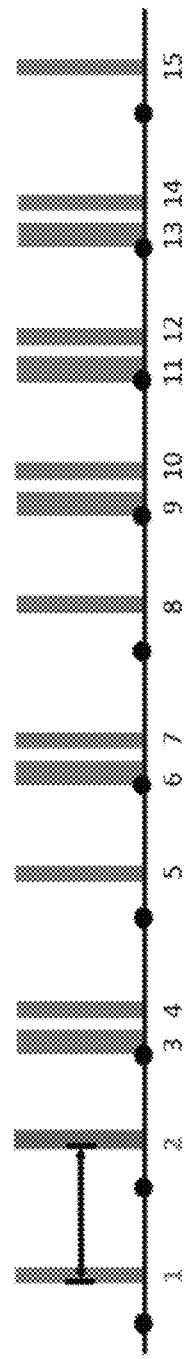
FIG. 5Z illustrates the results after applying, the first method to a burst of received radar pulses that have been impaired due to channel and filtering effects to correct the PRI and PW of the impaired pulses, in accordance with some embodiments of the present disclosure.
Figure 5C:
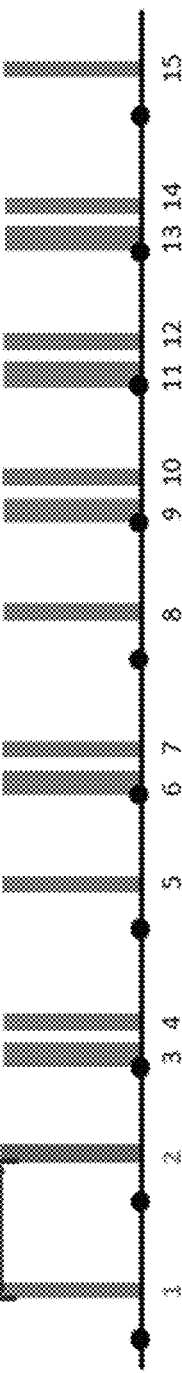
Figure 5D:
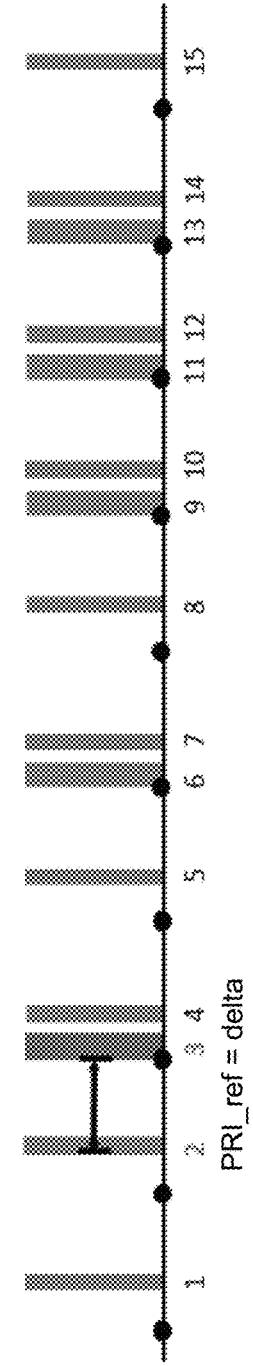
Figure 5E:
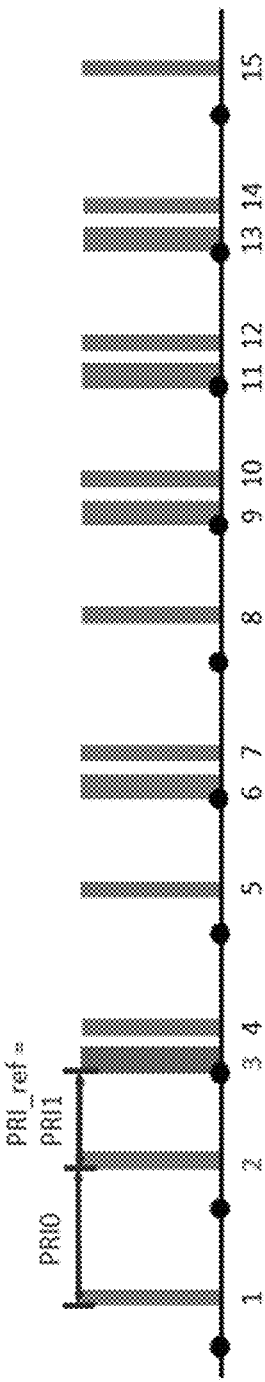
Figure 5F:
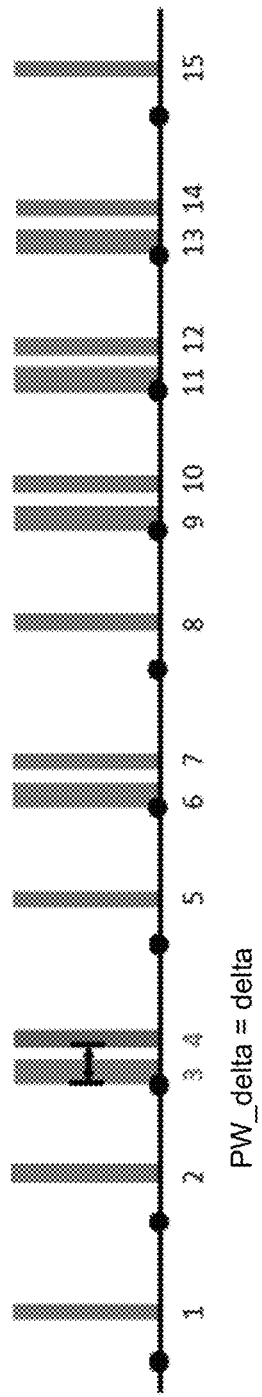
Figure 5G:
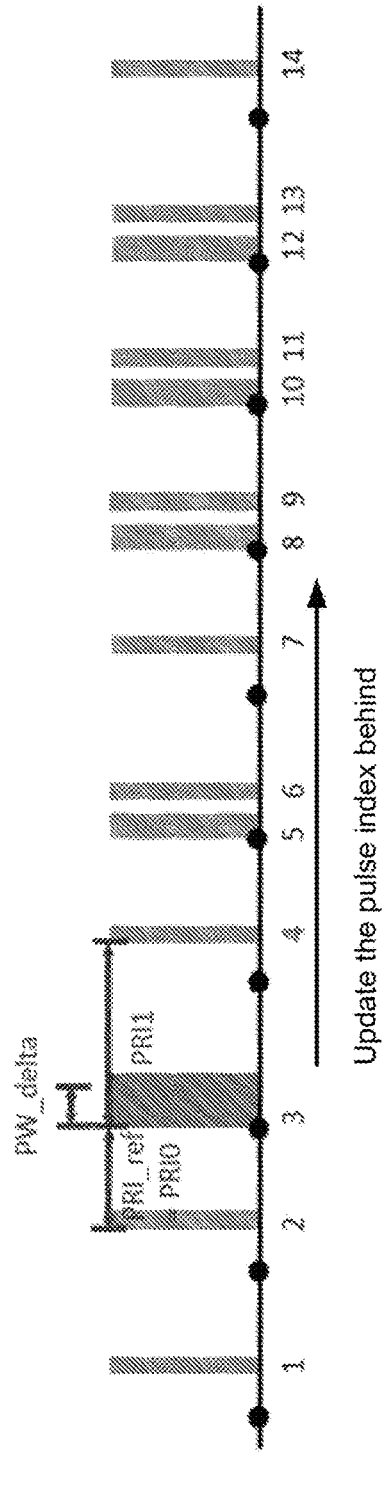
Figure 5H:
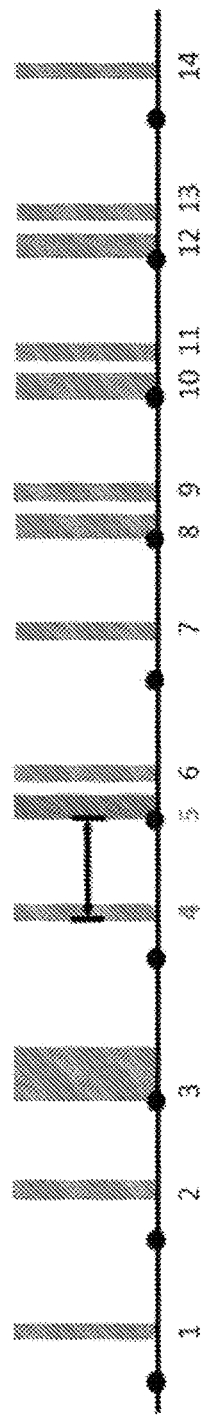
Figure 5I:
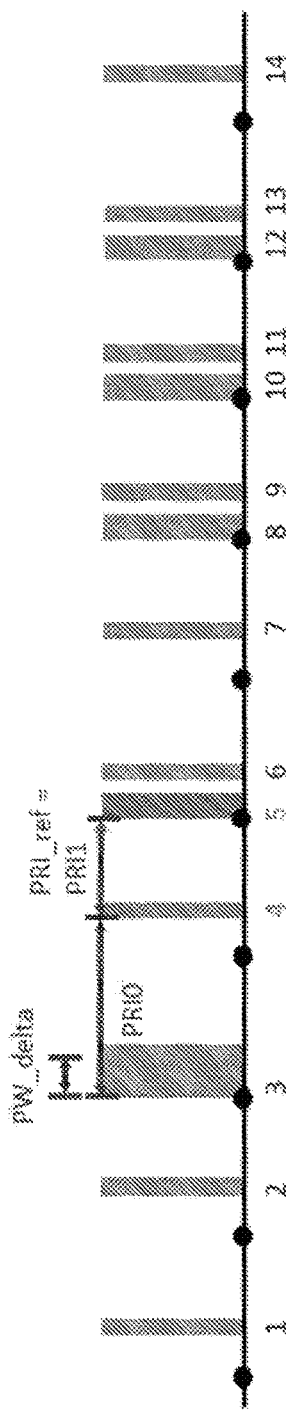
Figure 5J:
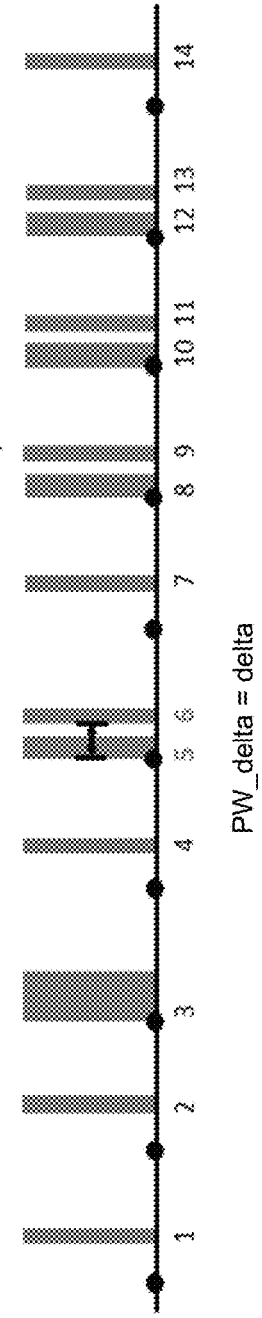
Figure 5K:
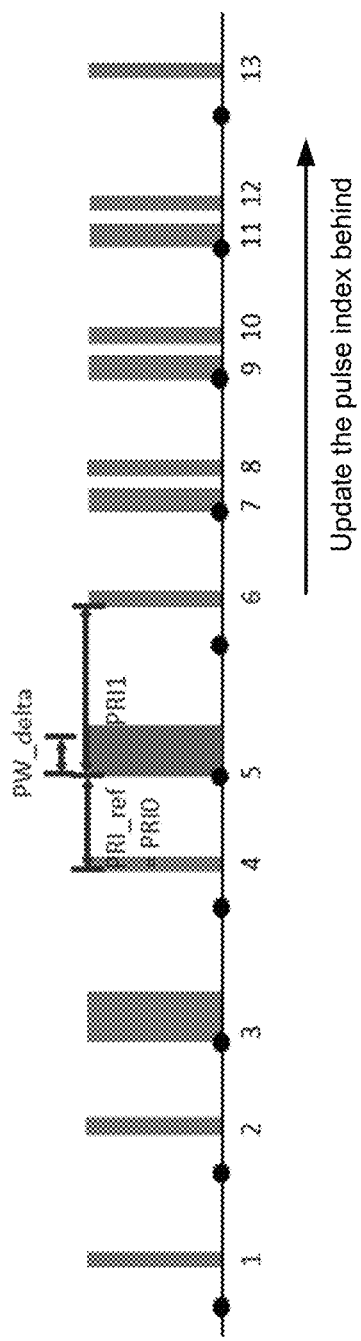
Figure 5L:
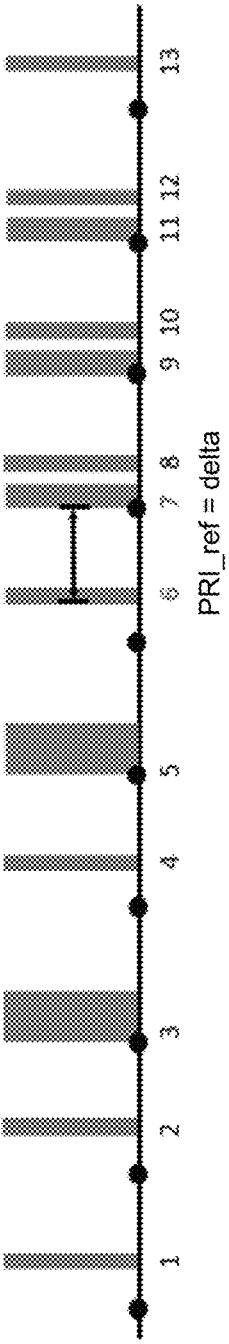
Figure 5M:
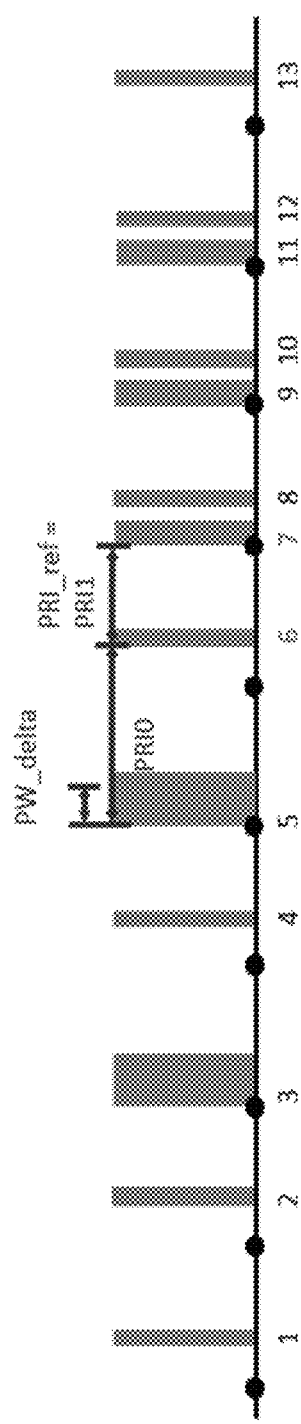
Figure 5N:
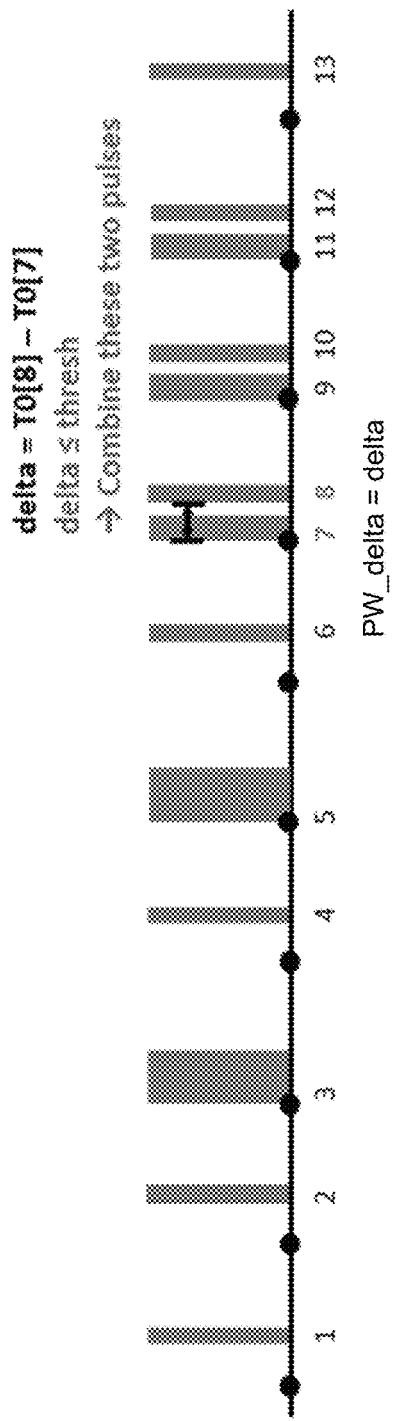
Figure 5O:
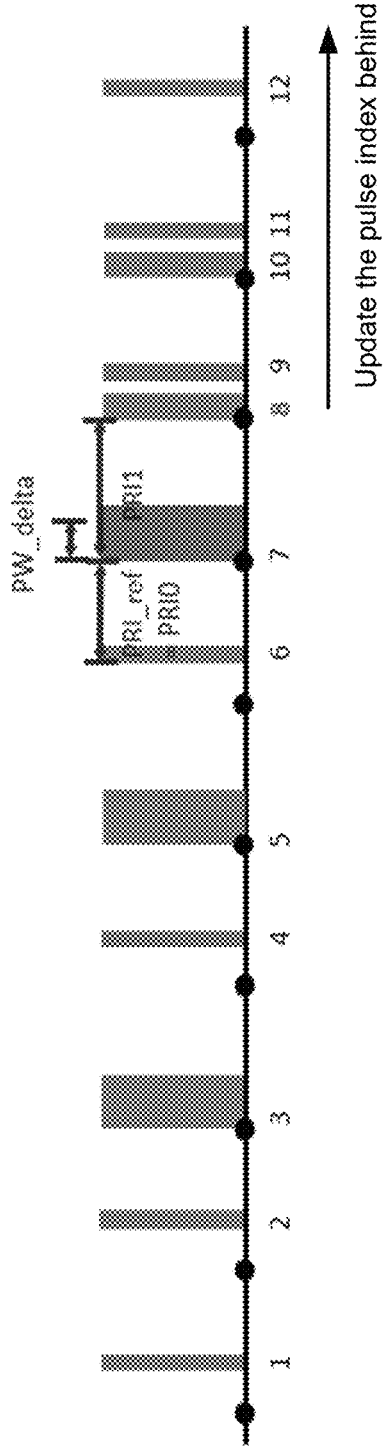
Figure 5P:
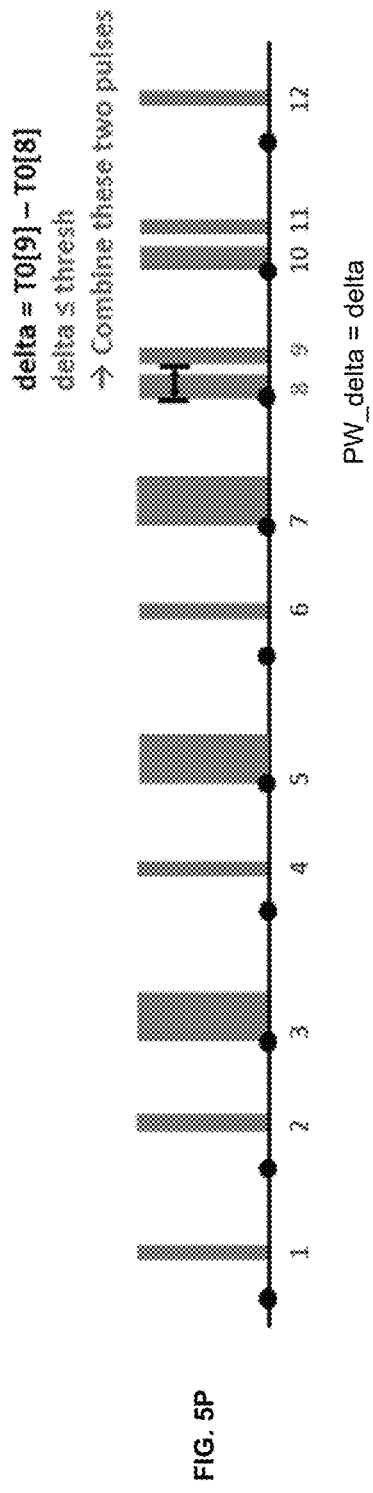
Figure 5Q:
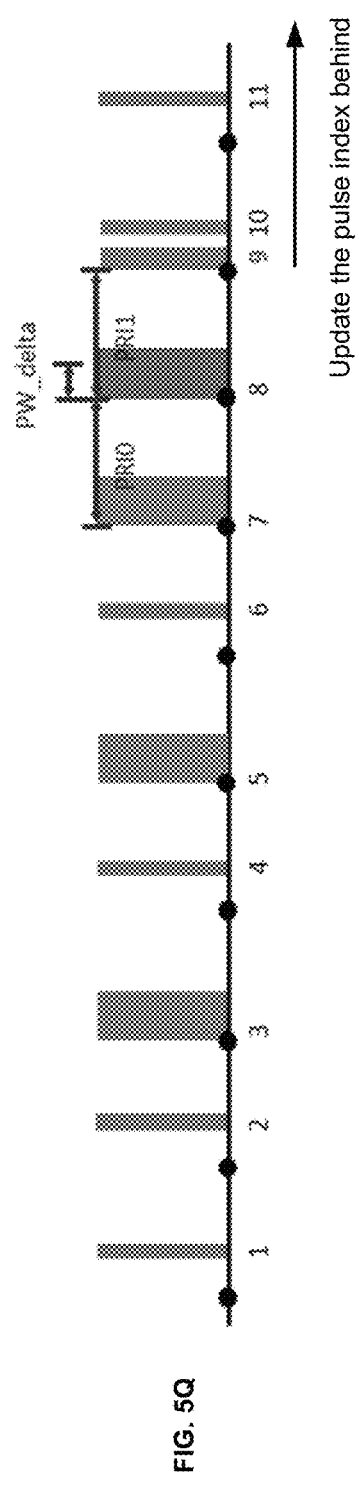
Figure 5R:
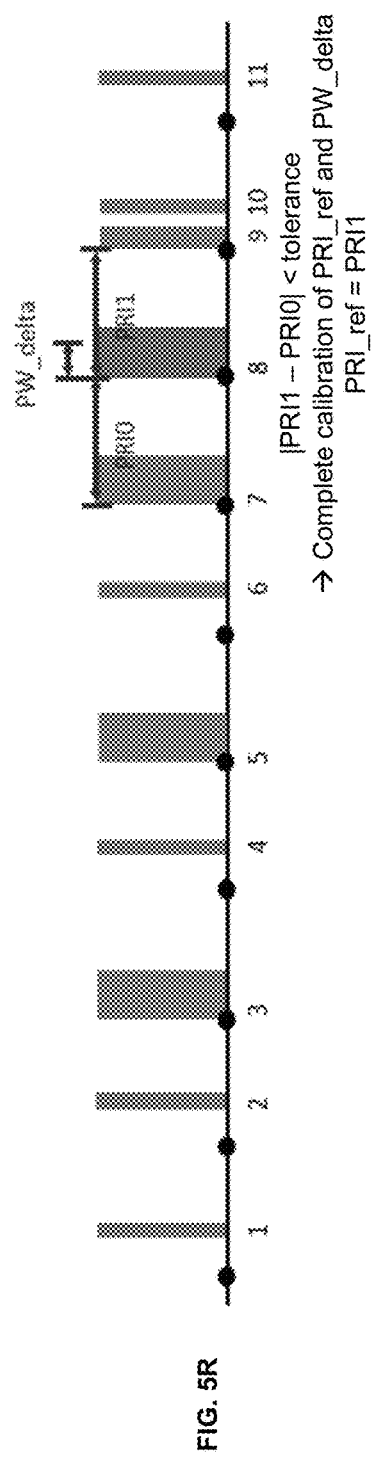
Figure 5V:
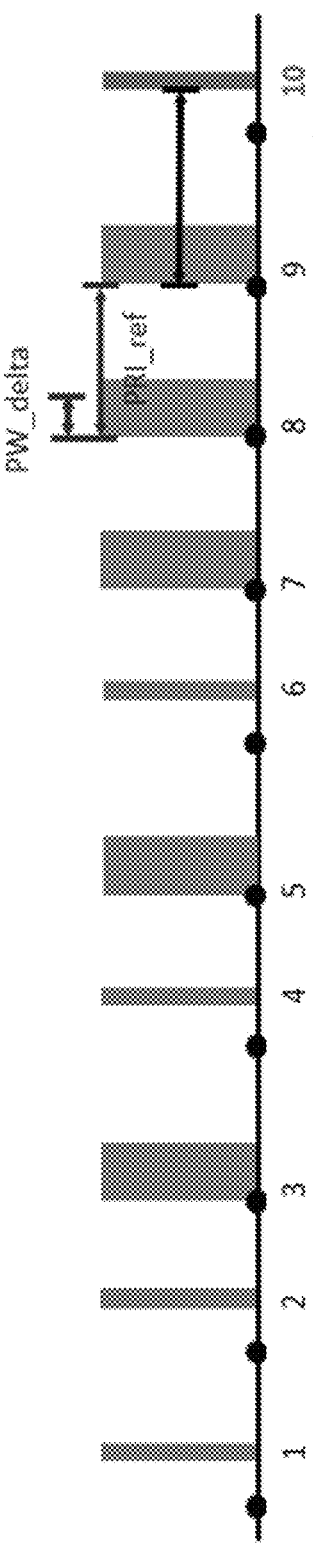
Figure 5W:
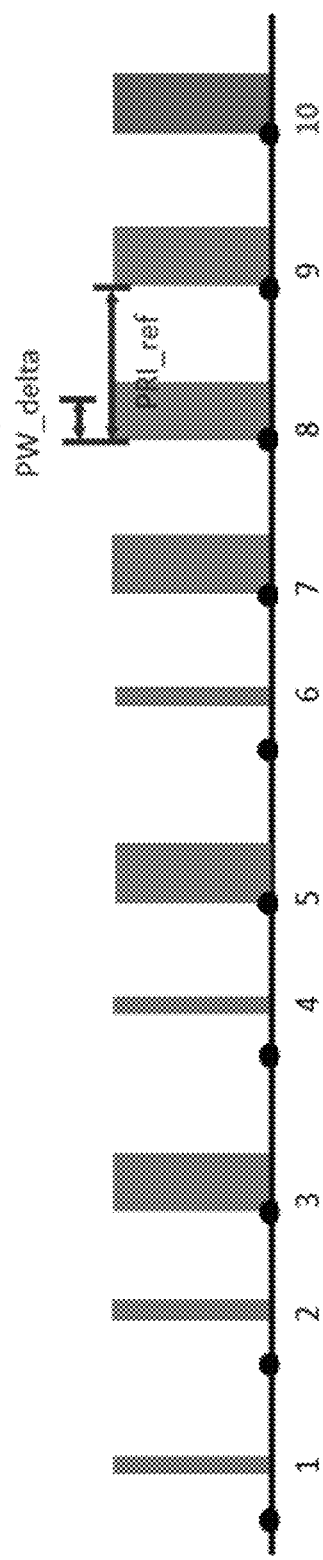
Figure 5X:
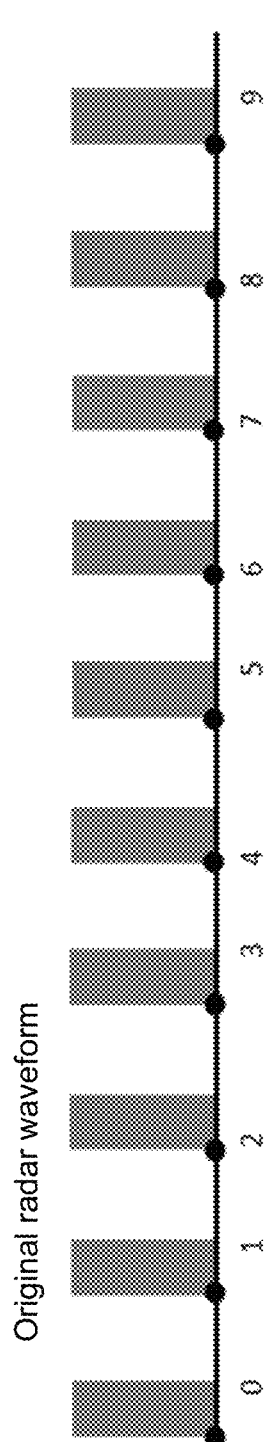
Figure 5Y:
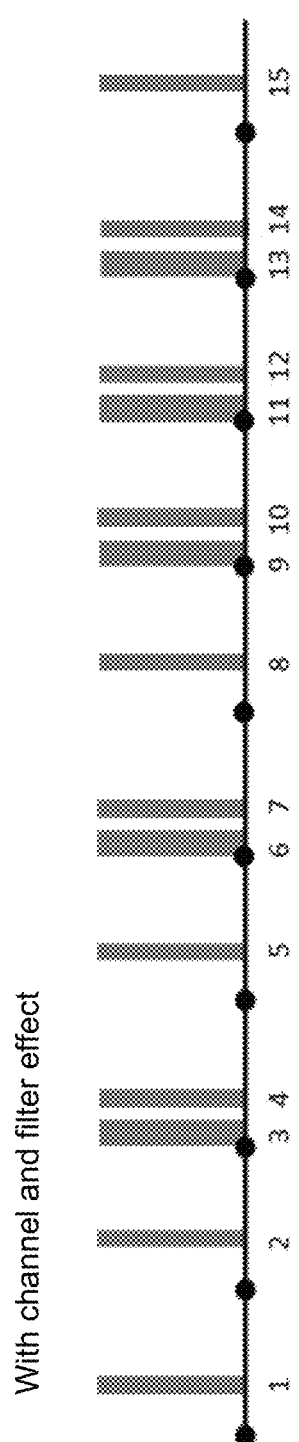
Figure 5Z:
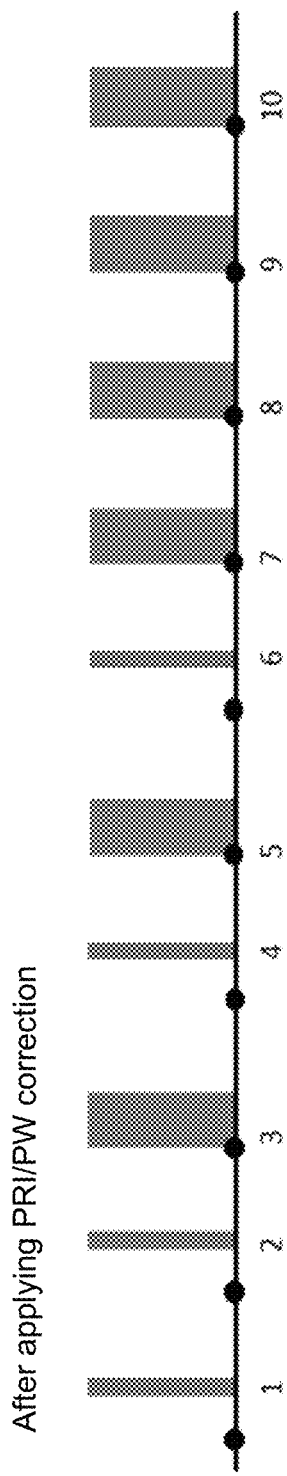

FIGS. 5A-5Y illustrate the results of a sequence of operations when applying, and FIG. 5Z illustrates the results after applying, the first method 400 to a burst of received radar pulses that have been impaired due to channel and filtering effects to correct the PRI and PW of the impaired pulses, in accordance with some embodiments of the present disclosure.

Operation 5A reads the T0 and PW of a train of 15 pulses from a FIFO. The pulses are indexed from 1 to 15 and the T0 and PW for the pulses are labeled T0[1:15] and PW[1:15]. Operation 5A may be performed by operation 401 of method 400 of FIG. 4.

Operation 5B determines that the delay (delta) between T0[2] and T0[1] is greater than a threshold. Operation 5B then estimates PRI_ref to be delta. Operation 5B may be performed by operation 407 of method 400.

Operation 5C sets PRI1, the current PRI between T0[2] and T0[1], to delta. PRI_ref is then also equal to PRI1.

Operation 5D reads T0[3] for the next pulse, pulse[3], from the FIFO and determines that delta between T0[3] and T0[2] is greater than the threshold. Operation 5D then updates PRI_ref to this latest delta. Operation 5D may be performed by operation 407 of method 400.

Operation 5E updates PRI1 to the delta between T0[3] and T0[2] and sets PRI0 to the delta between T0[2] and T0[1] as calculated in operation 5B.

Operation 5F reads T0[4] and PW[4] for the next pulse, pulse[4], from the FIFO and determines that delta between T0[4] and T0[3] is less than the threshold. Operation 5F then combines pulse[4] and pulse [3], sets PW of the combined pulse to (delta+PW[4]), and estimates PW_delta to be the delta between T0[4] and T0[3]. Operation 5F may be performed by operation 403 of method 400.

Operation 5G updates the indexing of the pulses, reads T0[4] for the next pulse after the re-indexing, pulse[4], from the FIFO, updates PRI1 to the delta between T0[4] and T0[3], and updates PRI0 to the delta between T0[3] and T0[2].

Operation 5H reads T0[5] for the next pulse, pulse[5], from the FIFO and determines that delta between T0[5] and T0[4] is greater than the threshold. Operation 5H then updates PRI_ref to this latest delta.

Operation 5I updates PRI1 to the delta between T0[5] and T0[4] and updates PRI0 to the delta between T0[4] and T0[3].

Operation 5J reads T0[6] and PW[6] for the next pulse, pulse[6], from the FIFO and determines that delta between T0[6] and T0[5] is less than the threshold. Operation 5J then combines pulse[6] and pulse[5], sets PW of the combined pulse to (delta+PW[6]), and updates PW_delta to the delta between T0[6] and T0[5].

Operation 5K updates the indexing of the pulses, reads T0[6] for the next pulse after the re-indexing, pulse[6], from the FIFO, updates PRI1 to the delta between T0[6] and T0[5], and updates PRI0 to the delta between T0[5] and T0[4].

Operation 5L reads T0[7] for the next pulse, pulse[7], from the FIFO and determines that delta between T0[7] and T0[6] is greater than the threshold. Operation 5L then updates PRI_ref to this latest delta.

Operation 5M updates PRI1 to the delta between T0[7] and T0[6] and updates PRI0 to the delta between T0[6] and T0[5].

Operation 5N reads T0[8] and PW[8] for the next pulse, pulse[8], from the FIFO and determines that delta between T0[8] and T0[7] is less than the threshold. Operation 5N then combines pulse[8] and pulse[7], sets PW of the combined pulse to (delta+PW[8]), and updates PW_delta to the delta between T0[8] and T0[7].

Operation 5O updates the indexing of the pulses, reads T0[8] for the next pulse after the re-indexing, pulse[8], from the FIFO, updates PRI1 to the delta between T0[8] and T0[7], and updates PRI0 to the delta between T0[7] and T0[6].

Operation 5P reads T0[9] and PW[9] for the next pulse, pulse[9], from the FIFO and determines that delta between T0[9] and T0[8] is less than the threshold. Operation 5P then combines pulse[9] and pulse[8], sets PW of the combined pulse to (delta+PW[9]), and updates PW_delta to the delta between T0[9] and T0[8].

Operation 5Q updates the indexing of the pulses, reads T0[9] for the next pulse after the re-indexing, pulse[9], from the FIFO, updates PRI1 to the delta between T0[9] and T0[8], and updates PRI0 to the delta between T0[8] and T0[7].

Operation 5R determines that PRI_ref has converged because the difference between PRI1 and PRI0 is within a tolerance value. Operation 5R completes calibration of PRI_ref and PW_delta and updates PRI_ref to PRI1. PW_delta remains as calculated in operation 5P. Operation 5R may be performed by operations 409 and 411 of method 400.

Operation 5S shows the state of the PRI_ref and PW_delta at the completion of the pulse calibration phase.

Operation 5T starts the pulse correction pulse. Operation 5T reads T0[10] and PW[10] for the next pulse, pulse[10], from the FIFO and determines that delta between T0[10] and T0[9] is less than the threshold. Operation 5T then combines pulse[10] and pulse[9], and sets PW of the combined pulse to (delta+PW[10]). Operation 5T may be performed by operation 412 of method 400.

Operation 5U updates the indexing of the pulses.

Operation 5V reads T0[11] and PW[11] for the next pulse, pulse[10], after the re-indexing, from the FIFO. Operation 5V determines that the delta between T0[10] and T0[9] is equal to the sum of PRI_ref and PW_delta to within a tolerance value. Operation 5V assumes that there is a missing pulse that should have been detected at PW_delta before T0[10]. Operation 5V adds a new pulse at (T0[10]−PW_delta). Operation 5V may be performed by operations 413 and 415 of method 400.

Operation 5W combines the added pulse and pulse[10] to generate a combined pulse with a PW that is (PW[10]+PW_delta). Operation 5V may be performed by operation 415 of method 400.

Operation 5X shows the original radar pulses from the transmitter with uniform PW and PRI.

Operation 5Y shows the received pulses at the WLAN device impaired due to the channel and filtering effects. The impaired pulses have broken pulses showing shortened PW and varying PRI.

Operation 5Z shows the reconstructed pulses after applying method 400 to correct the PRI and PW of the impaired pulses. Pulse correction using the calibrated PRI_ref and PW_delta is performed starting from pulse[9]. The reconstructed pulses exhibit relatively uniform PW and PRI.

Figure 6:
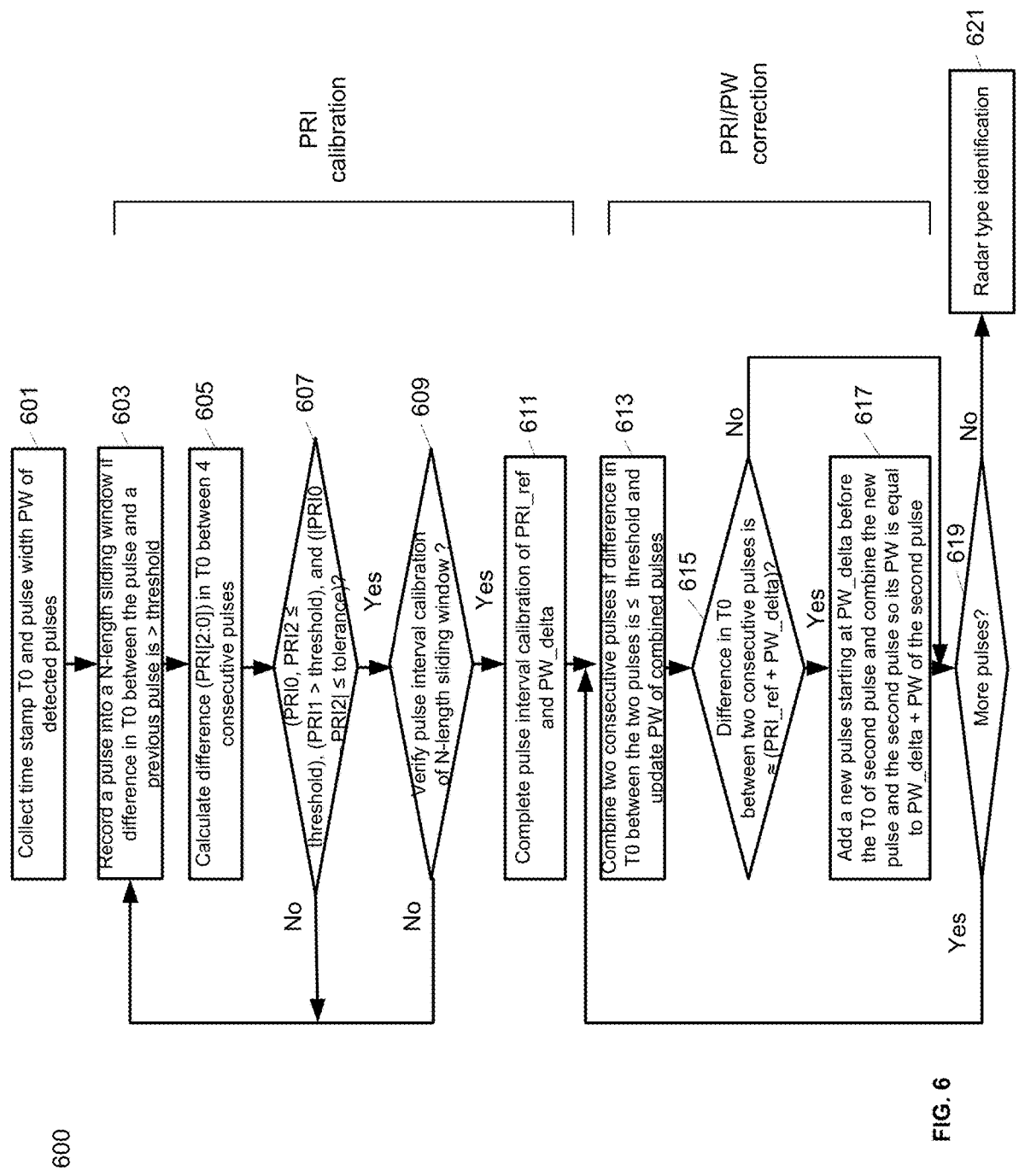
FIG. 6 illustrates a flow diagram of a second method for a WLAN device to calibrate the PRI and the delays between partial pulses of impaired radar pulses, and to use the calibrated results to correct the PRI and PW of the impaired radar pulses, in accordance with some embodiments of the present disclosure.

FIG. 6 illustrates a flow diagram of a second method 600 for a WLAN device to calibrate the PRI_ref and PW_delta of impaired radar pulses, and to use the calibrated results to correct the PRI and PW of the impaired radar pulses, in accordance with some embodiments of the present disclosure. The method 600 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 600 may be performed by a WLAN DFS master device or a processing device included in a WLAN device.

Method 600 performs the pulse calibration operation and pulse correction operation by processing stored radar pulses using two passes. In a first pass, method 600 may process the stored radar pulses to calibrate the PRI_ref and PW_delta. Once the pulse calibration is complete, method 600 processes the stored radar pulses again using a second pass to correct the stored radar pulses using the calibrated PRI_ref and PW_delta. Method 600 thus corrects all the stored radar pulses, in contrast to method 400.

At operation 601, the method collects the timestamp T0 and pulse width PW of detected pulses. The timestamp T0 of a pulse may be the state of an internal clock of the WLAN device when the power of the received pulse first crosses a detection threshold. The PW of a pulse may be the difference in the timestamp T0 and a timestamp when the received power of the pulse falls below the detection threshold. In one embodiment, T0 and PW of pulses detected by the WLAN may be written into a FIFO. Software or firmware may read the FIFO to retrieve the T0 and PW of the pulses to calibrate the PRI_ref and the PW_delta of the pulses, and to use the calibrated results to correct the PRI and PW of the pulses.

At operation 603, the method may search the pulses for a sliding window of consecutive pairs of pulses that are each separated by at least a threshold. In one embodiment, the threshold may be a predefined threshold. In one embodiment, the sliding window may be a 5-length sliding window of 5 pulses containing 4 consecutive pairs of pulses that are each separated by greater the threshold. More generally, the sliding window may be an N-length slide window of N pulses containing (N−1) consecutive pairs of pulses that are each separated by greater than the threshold. One or more of the N pulses may be broken into multiple partial pulses. The total number of pulses in the N-length sliding window including the partial pulses may be greater than N.

At operation 605, the method calculates the delta in T0 between four consecutive pulses of the N-length sliding window. The four consecutive pulses may include the partial pulses. If two consecutive pulses are partial pulses, the delta between the two consecutive partial pulses may be less than the threshold because the partial pulses are part of the same original pulse. In one embodiment, if the four consecutive pulses are indexed pulse[4:1], the delta between pulse[4] and pulse[3] may be designated PRI[2]; the delta between pulse[3] and pulse [2] may be designated PRI[1]; and the delta between pulse[2] and pulse[1] may be designated PRI[0].

At operation 607, the method determines if the four consecutive pulses of the N-length sliding window are the impaired pulses of two consecutive full pulses that have been broken into four partial pulses. In one embodiment, the method determines if 0<PRI0≤threshold, PRI1>threshold, 0<PRI2≤threshold, and |PRI2−PRI0|≤tolerance. If the condition is satisfied, the N-length sliding window is determined to contain two consecutive full pulses that are broken into four partial pulses. The N-length sliding window will then be selected to pulse calibrate and to verify the pulse calibration of PRI_ref and PW_delta. Otherwise, if the condition is not satisfied, the method returns to operations 603 and 605 to search the pulses for another N-length sliding window that satisfies the condition.

At operation 609, the method may pulse calibrate PRI_ref and PW_delta using the two consecutive full pulses that are broken into four partial pulses of the N-length sliding window. In one embodiment, operation 609 may estimate or calibrate the PRI_ref to PRI1 and may estimate or calibrate the PW_delta to PRI2. Operation 609 may and verify the calibrated PRI_ref and PW_delta using pulses in the N-length sliding window. In one embodiment of a 5-length sliding window, operation 609 may determine if 3 consecutive pulses of the 5-length sliding window are separated by delays that match the calibrated PRI_ref and PW_delta to within a tolerance. The 5-length sliding window contains 3 different combinations of 3 consecutive pulses. Calibration is complete when all 3 combinations of the 3 consecutive pulses are successfully verified using the calibrated PRI_ref and PW_delta.

Figure 7:
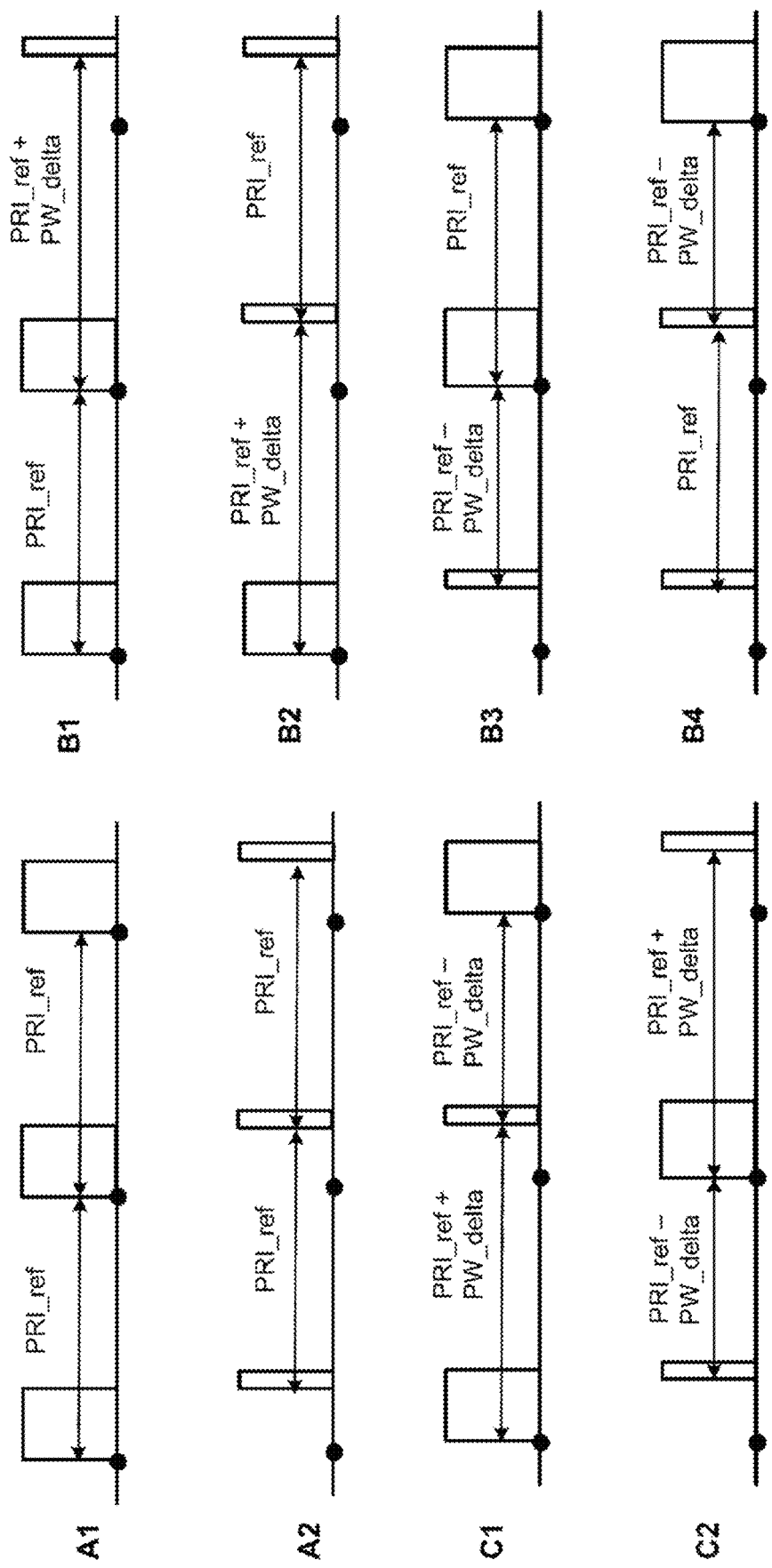
FIG. 7 illustrates the possible permutations of the locations of 3 consecutive impaired radar pulses that are used by the pulse interval calibration stage of the second method to verify the calibrated PRI and the calibrated delays between partial pulses of impaired radar pulses, in accordance with some embodiments of the present disclosure.

FIG. 7 illustrates the possible permutations of the locations of 3 consecutive impaired radar pulses that are used by the pulse calibration operation 609 of method 600 to verify the calibrated PRI_ref and PW_delta, in accordance with some embodiments of the present disclosure. There are 8 permutations of the T0 of the 3 consecutive pulses as shown. The verification will be considered as successful if the T0 of the 3 consecutive pulses matches any of the 8 permutations and the verification will be considered as failed if the T0 of the 3 consecutive pulses fails to match any of the 8 permutations.

Assume the three consecutive pulses are indexed [0:2] left to right; PRIA is the delta between T0[1] and T0[0]; PRIB is the delta between T0[2] and T0[1]; X=PRI_ref; Y=PW_delta. The 8 permutations of pulse[2:0] generate the following 8 conditions for verifying the calibrated PRI_ref and PW_delta:

$\{X,Y\}$,2pairs.=$\{|PRIA-PRIB|\le tol\&\&|PRIA-X|\le tol$
$\&\&|PRIB-X|\le tol\}$     1. Condition A:

$\{X,X+Y\},\{X+Y,X\},\{X-Y,X\},\{X,X-Y\}$,4pairs=$\{$
$(|PRIA-PRIB|\le Y+tol)\&\&((|PRIA-(X+Y)$
$|\le tol\&\&|PRIB-X|\le tol)||(|PRIA-$
$X|\le tol\&\&|PRIB-(X+Y)|\le tol)||(|PRIA-$
$X|\le tol\&\&|PRIB-(X-Y)|\le tol)||(|PRIA-(X-Y)$
$|\le tol\&\&|PRIB-X|\le tol))\}$     2. Condition B:

$\{X+Y,X-Y\},\{X-Y,X+Y\}$,2pairs=$\{(PRIA-PRIB\le 2Y+$
$tol)\&\&((|PRIA-(X-Y)|\le tol\&\&|PRIB-(X+Y)$
$|\le tol)||(|PRIA-(X+Y)|\le tol\&\&|PRIB-(X-Y)$
$|\le tol))\}$     3. Condition C:

The 5-length sliding window contains three different combinations of three consecutive pulses. Calibration is declared a success when all three verification runs using the three different combinations of three consecutive pulses are successful.

Figure 8:
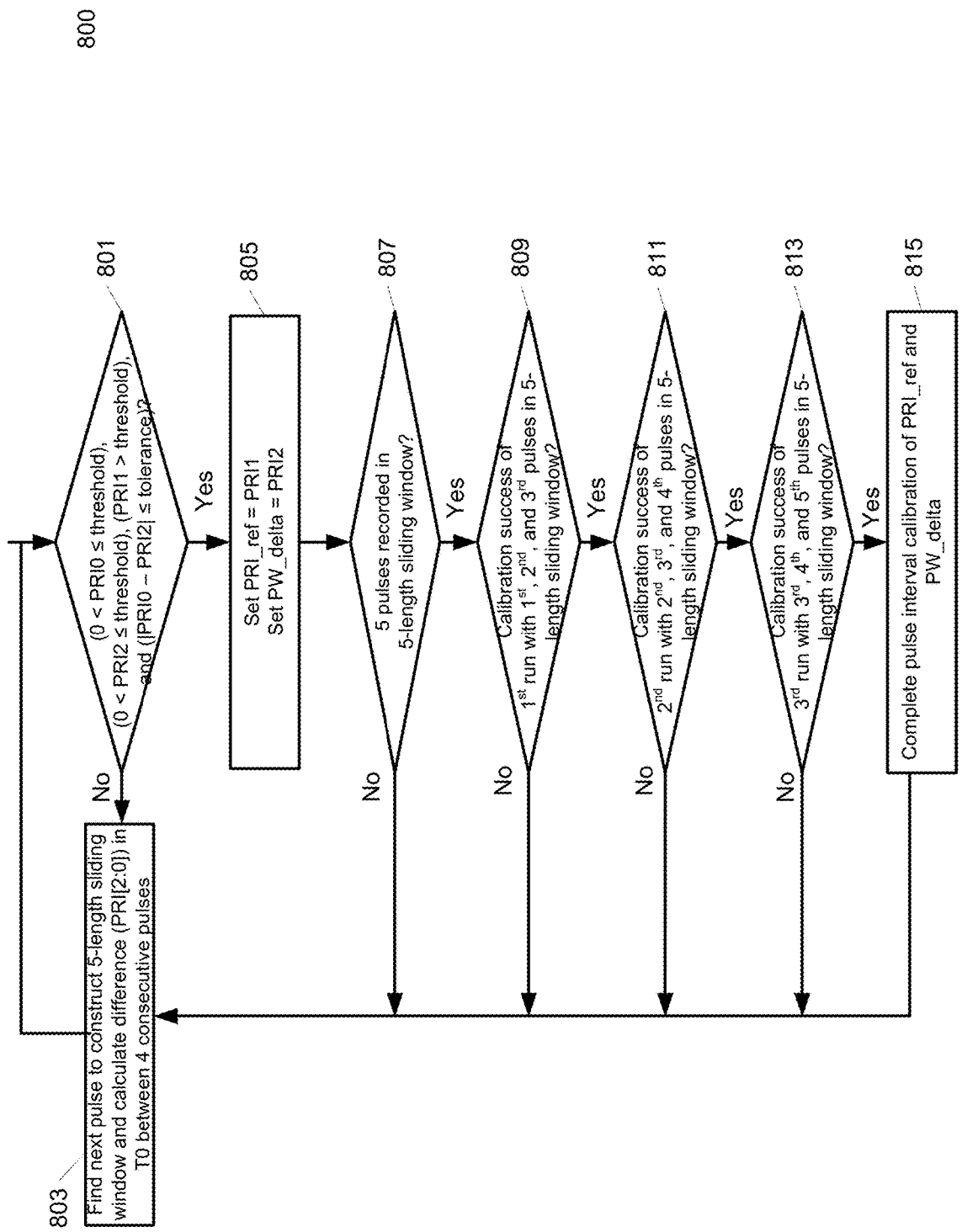
FIG. 8 illustrates a flow diagram of a method to verify the calibrated PRI and the calibrated delays between partial pulses of impaired radar pulses on a 5-length sliding window of 5 pulses as part of the pulse interval calibration stage of the second method, in accordance with some embodiments of the present disclosure.

FIG. 8 illustrates a flow diagram of a method 800 to verify the calibrated PRI_ref and PW_delta of impaired radar pulses on a 5-length sliding window of 5 pulses as part of the pulse verification operation 609 of method 600, in accordance with some embodiments of the present disclosure.

Operation 801 is the same as operation 607 of method 600 of FIG. 6 and will not be repeated for sake of brevity.

At operation 805, the operation sets PRI_ref to PRI1 and sets PW_delta to PRI2, similar to operation 607.

At operation 807, the method determines if 5 pulses are recorded in the 5-length sliding window. If 5 pulses are recorded in the 5-length sliding window, the method verifies the calibrated PRI_ref and PW_delta using three different combinations of three consecutive pulses of the 5-length sliding window. Otherwise, the method searches for another 5-length sliding window to calibrate PRI_ref and PW_delta in operation 803. Operation 803 may be similar to operations 603 and 605 of method 6 of FIG. 6 and will not be repeated for brevity.

At operation 809, the method determines if the verification of PRI_ref and PW_delta using the first three consecutive pulses of the 5-length sliding window is successful.

At operation 811, the method determines if the verification of PRI_ref and PW_delta using the second three consecutive pulses of the 5-length sliding window is successful.

At operation 813, the method determines if the verification of PRI_ref and PW_delta using the third three consecutive pulses of the 5-length sliding window is successful.

At operation 815, if all three verification runs using the three different combinations of three consecutive pulses of the 5-length sliding window is successful, the calibration and verification of PRI_ref and PW_delta is declared successful. Otherwise, if at least one verification run fails, the method searches another 5-length sliding window to calibrate PRI_ref and PW_delta in operation 803.

Returning to FIG. 6, the method completes the calibration of PRI_ref and PW_delta. Operations 603, 605, 607, 609, and 611 are classified as operations of the PRI calibration phase of the method. After completion of the PRI calibration phase, the method may use the calibrated PRI_ref and PW_delta to correct the impaired pulses in a second pass to reconstruct the original pulses.

At operation 613, the operation may compare the difference between the T0 of a current pulse and the T0 of an immediately preceding pulse with a threshold. In one embodiment, the threshold may be a predefined threshold. If the delay between the current pulse and the immediately preceding pulse is less than or equal to the threshold, the two consecutive pulses may be assumed as two partial pulses of a full transmitted pulse. The method may combine the two consecutive pulses to reconstruct the transmitted pulse with a PW that is a sum of the PW of the current pulse and the delay between the current pulse and the immediately preceding pulse.

At operation 615, the method may compare the delay between a current pulse and an immediately preceding pulse with the sum of PRI_ref and PW_delta. This operation is similar to operation 413 of method 400 of FIG. 4. In one embodiment, operation 615 may compare the difference between the T0 of the current pulse and the T0 of the immediately preceding pulse with the sum of PRI_ref and PW_delta.

If the delay between the current pulse and the immediately preceding pulse is equal to the sum of PRI_ref and PW_delta to within a tolerance value, the method may assume there is a missing pulse that should have been detected at PW_delta before the current pulse. The current pulse is assumed to be a partial pulse that is delayed by PW_delta from the position of the missing pulse. At operation 617, the operation may add a pulse PW_delta before T0 of the current pulse and may combine the added pulse with the current pulse to reconstruct a pulse with a PW that is a sum of PW_delta and the PW of the current pulse. The added pulse and the current pulse are considered the two partial pulses of the combined pulse. Operation 617 is similar to operation 415 of method 400 of FIG. 4.

If the comparison of operation 615 is not satisfied or if the added pulse at PW_delta before T0 of the current pulse has been combined with the current pulse to reconstruct the pulse as described in operation 617, at operation 619 the method may check to see if additional impaired pulses from the FIFO are to be processed.

If there are additional impaired pulses to be corrected, the method may repeat operations 613, 615, and 617 until all impaired pulses from the FIFO are corrected. Operations 613, 615, and 617 are classified as operations of the PRI/PW correction phase of the method.

At operation 621, after the PRI/PW correction phase, the method may perform radar type identification using the reconstructed pulses. Operation 621 is similar to operation 419 of method 400 of FIG. 4 and will not be repeated for brevity.

Figure 9A:
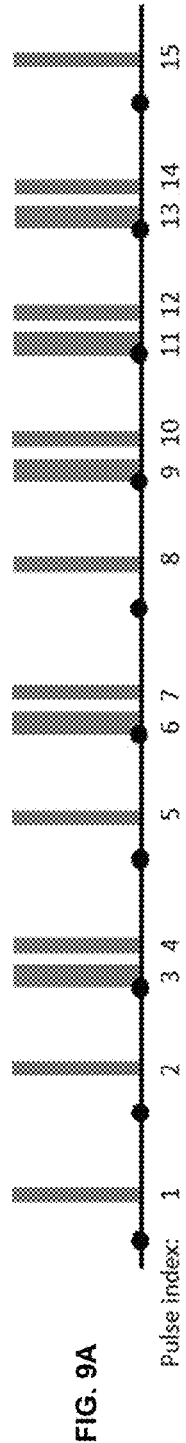
FIGS. 9A-9Z illustrate the results of a sequence of operations to apply the pulse interval calibration stage of the second method to a burst of received radar pulses that have been impaired due to channel and filtering effects to obtain calibrated PRI and calibrated delays between partial pulses of impaired radar pulses, in accordance with some embodiments of the present disclosure.
Figure 9B:
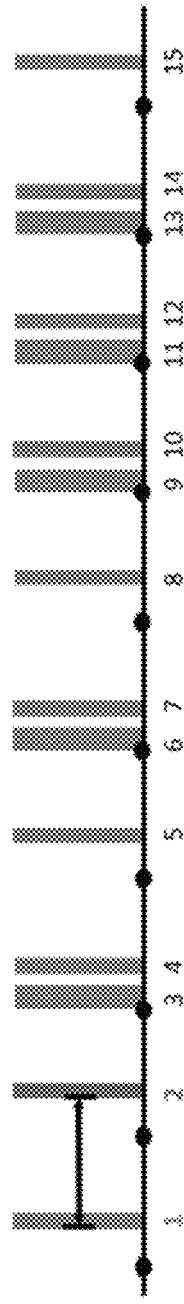
Figure 9C:
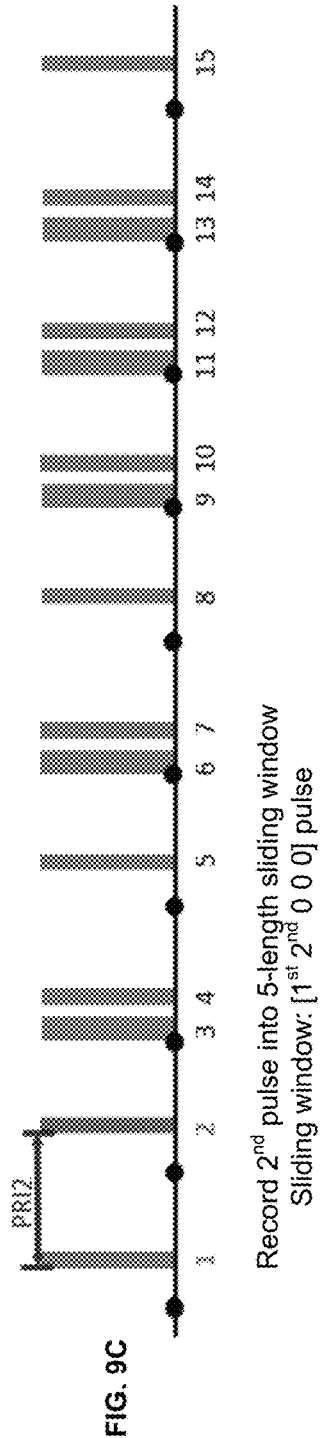
Figure 9G:
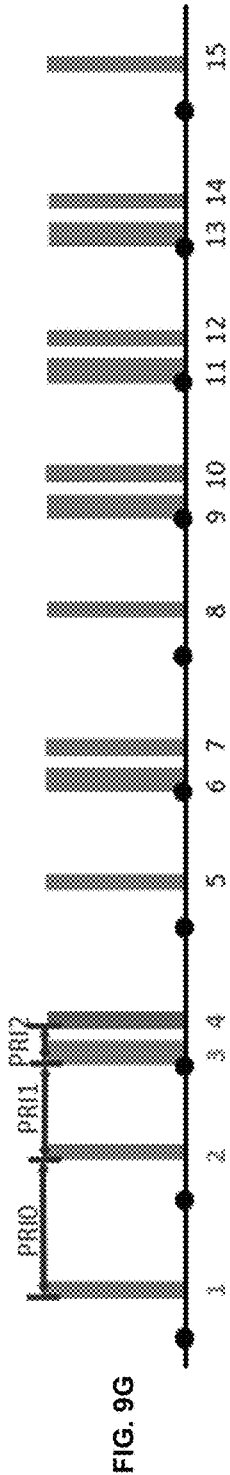
Figure 9H:
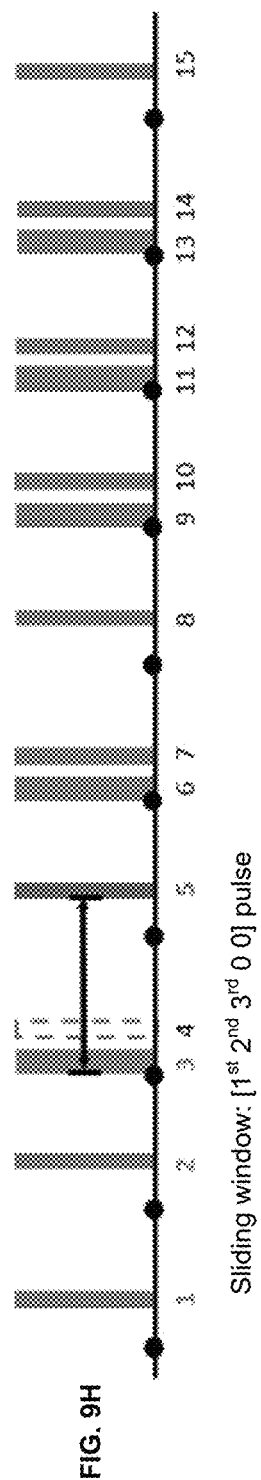
Figure 9I:
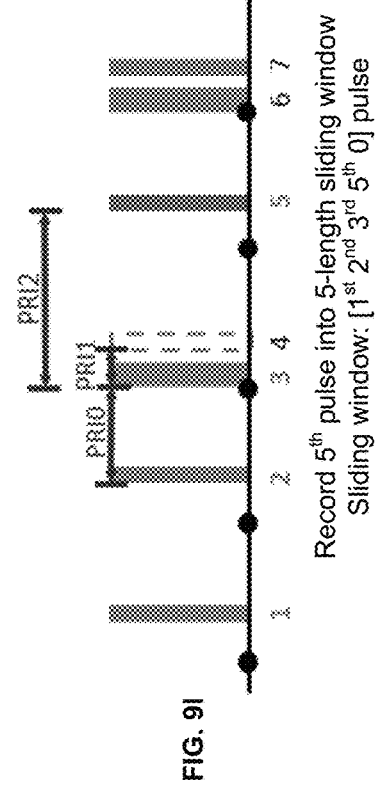
Figure 9S:
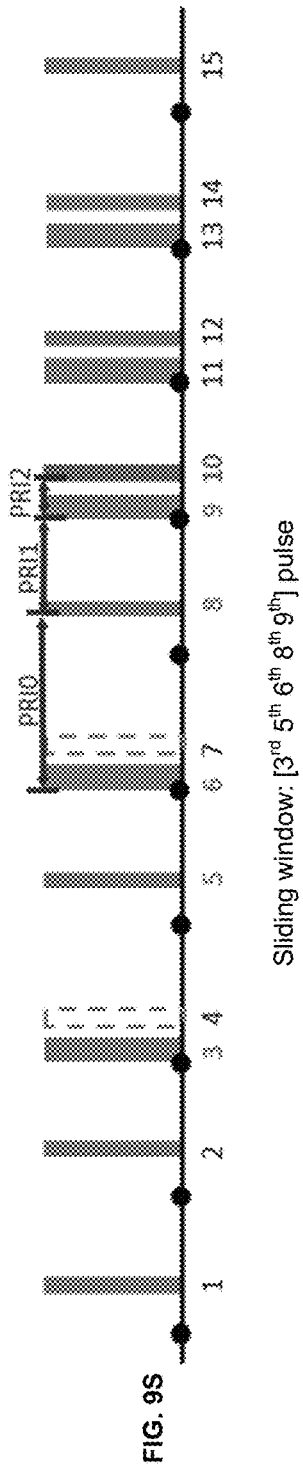
Figure 9T:
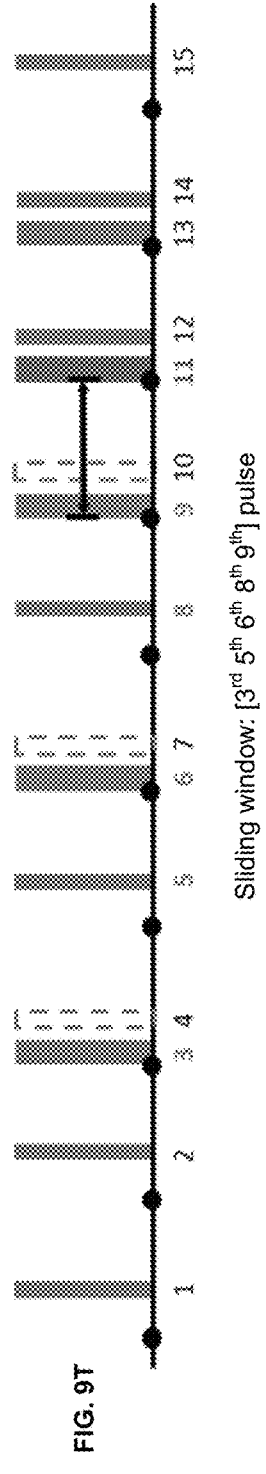
Figure 9U:
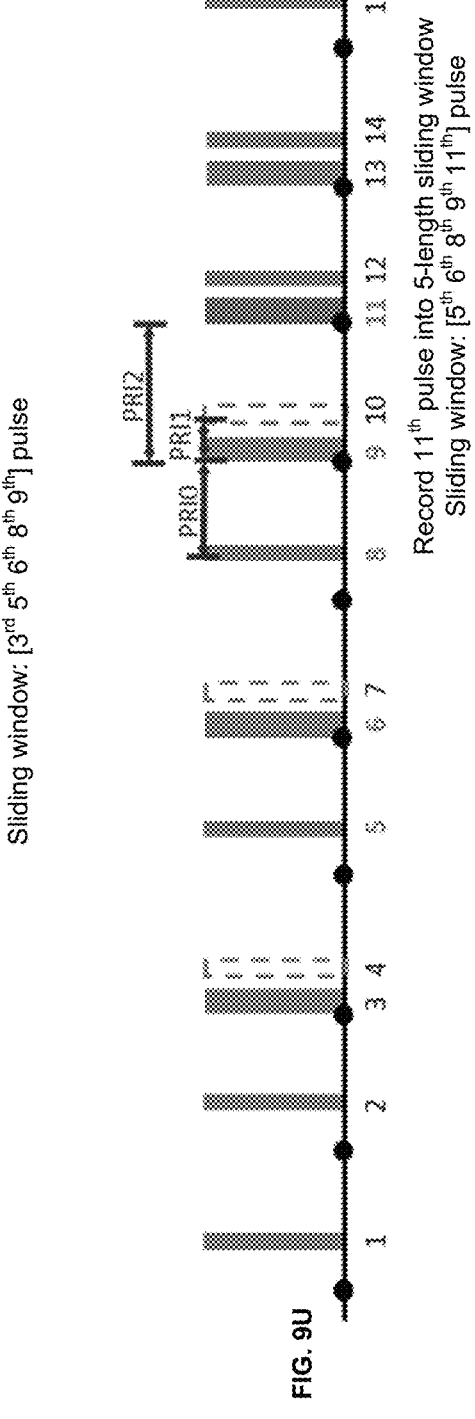
Figure 9V:
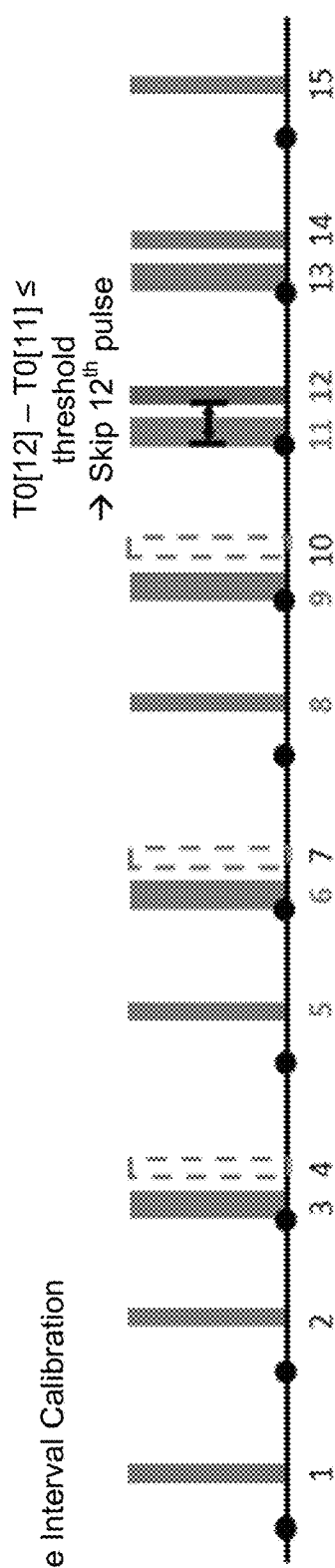
Figure 9W:
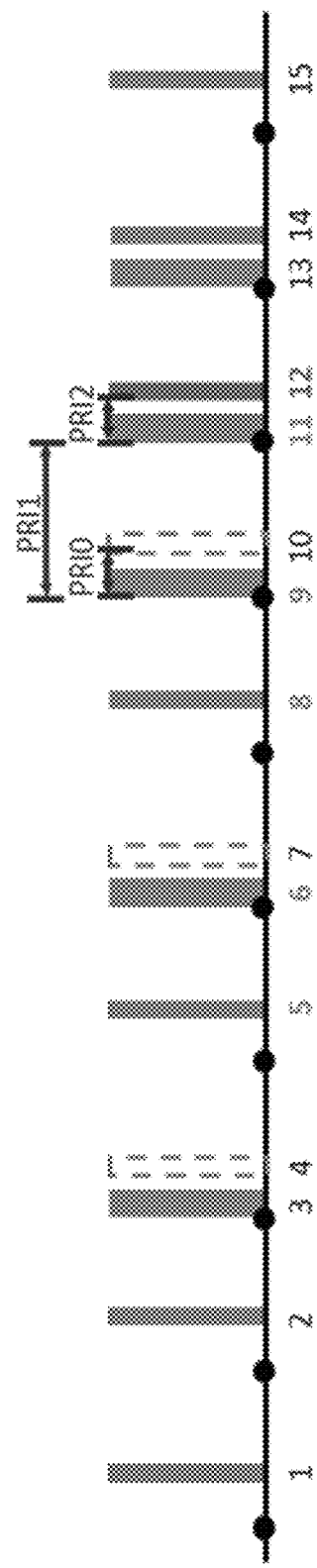
Figure 9X:
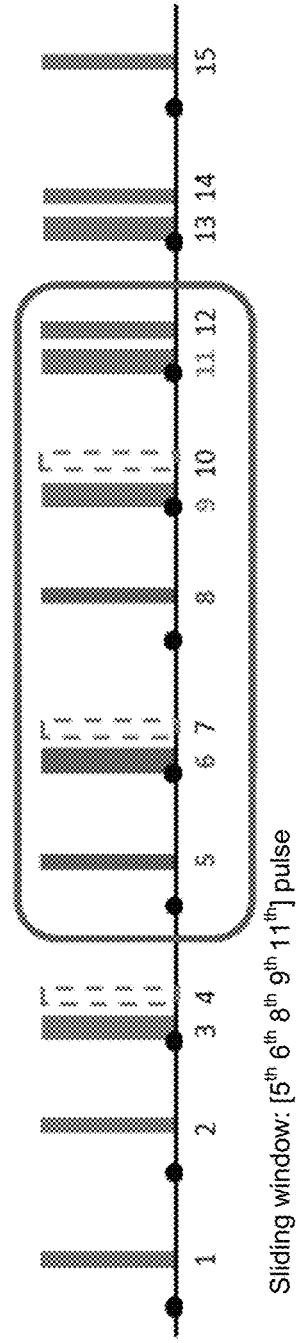
Figure 9Y:
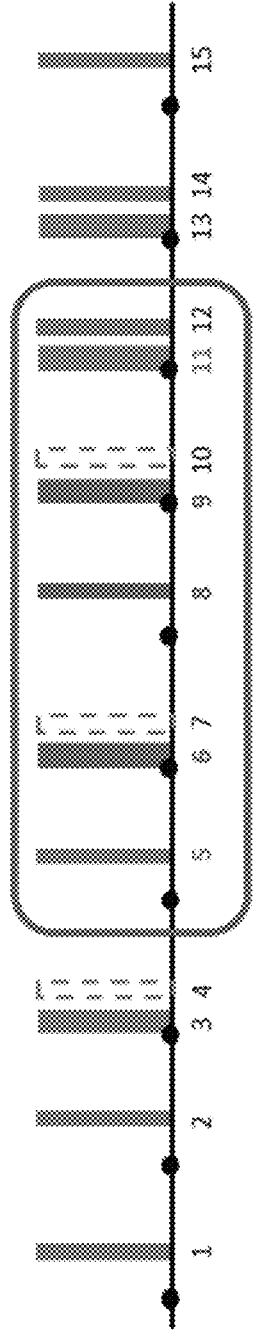
Figure 9Z:
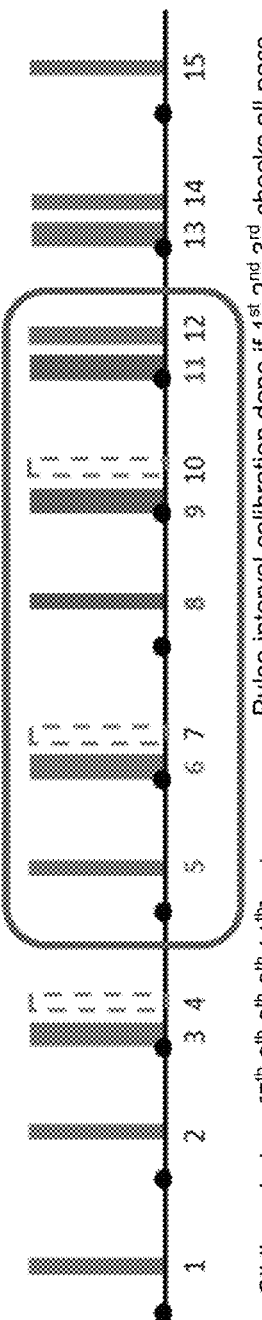

FIGS. 9A-9Z illustrate the results of a sequence of operations when applying the pulse interval calibration stage of the second method 600 to a burst of received radar pulses that have been impaired due to channel and filtering effects to obtain calibrated PRI_ref and PW_delta, in accordance with some embodiments of the present disclosure.

Operation 9A reads the T0 and PW of a train of 15 pulses from a FIFO. The pulses are indexed from 1 to 15 and the T0 and PW for the pulses are labeled T0[1:15] and PW[1:15]. Operation 9A may be performed by operation 601 of method 600 of FIG. 6.

Operation 9B determines that the delay (delta) between T0[2] and T0[1] is greater than a threshold. Operation 9B then records pulse[1] in a 5-length sliding window. Operation 9B may be performed by operation 603 of method 600.

Operation 9C sets PRI2, the PRI between T0[2] and T0[1], to delta, and records pulse[2] in the 5-length sliding window. Operation 9C may be performed by operation 603 of method 600.

Operation 9D reads T0[3] for the next pulse, pulse[3], from the FIFO and determines that delta between T0[3] and T0[2] is greater than the threshold.

Operation 9E updates PRI2 to the delta between T0[3] and T0[2] and sets PRI1 to the delta between T0[2] and T0[1] as calculated in operation 9B. Operation records pulse[3] in the 5-length sliding window.

Operation 9F reads T0[4] for the next pulse, pulse[4], from the FIFO and determines that delta between T0[4] and T0[3] is less than the threshold. Operation then skips pulse [4] by not recording pulse[4] in the 5-length sliding window.

Operation 9G updates PRI2 to the delta between T0[4] and T0[3], updates PRI1 to the delta between T0[3] and T0[2], and sets PRI0 to the delta between T0[2] and T0[1].

Operation 9H reads T0[5] for the next pulse, pulse[5], from the FIFO and determines that delta between T0[5] and T0[3] is greater than the threshold.

Operation 9I records pulse[5] in the 5-length sliding window. Operation 9I updates PRI2 to the delta between T0[5] and T0[3], updates PRI1 to the delta between T0[4] and T0[3], and updates PRI0 to delta between T0[3] and T0[2].

Operation 9J reads T0[6] for the next pulse, pulse[6], from the FIFO and determines that delta between T0[6] and T0[5] is greater than the threshold.

Operation 9K records pulse[6] in the 5-length sliding window. Operation 9K updates PRI2 to the delta between T0[6] and T0[5], updates PRI1 to the delta between T0[5] and T0[3], and updates PRI0 to delta between T0[4] and T0[3].

Operation 9L reads T0[7] for the next pulse, pulse[7], from the FIFO and determines that delta between T0[7] and T0[6] is less than the threshold. Operation 9L then skips pulse[7] by not recording pulse[4] in the 5-length sliding window.

Operation 9M updates PRI2 to the delta between T0[7] and T0[6], updates PRI1 to the delta between T0[6] and T0[5], and updates PRI0 to delta between T0[5] and T0[3].

Operation 9N reads T0[8] for the next pulse, pulse[8], from the FIFO and determines that delta between T0[8] and T0[6] is more than the threshold.

Operation 9K records pulse[8] in the 5-length sliding window. Operation 9O updates PRI2 to the delta between T0[8] and T0[6], updates PRI1 to the delta between T0[7] and T0[6], and updates PRI0 to delta between T0[6] and T0[5].

Operation 9P reads T0[9] for the next pulse, pulse[9], from the FIFO and determines that delta between T0[9] and T0[8] is more than the threshold.

Operation 9Q records pulse[9] in the 5-length sliding window. Operation 9Q updates PRI2 to the delta between T0[9] and T0[8], updates PRI1 to the delta between T0[8] and T0[6], and updates PRI0 to delta between T0[7] and T0[6].

Operation 9R reads T0[10] for the next pulse, pulse[10], from the FIFO and determines that delta between T0[10] and T0[9] is less than the threshold. Operation 9R then skips pulse[10] by not recording pulse[10] in the 5-length sliding window.

Operation 9S updates PRI2 to the delta between T0[10] and T0[9], updates PRI1 to the delta between T0[9] and T0[8], and updates PRI0 to delta between T0[8] and T0[6].

Operation 9T reads T0[11] for the next pulse, pulse[11], from the FIFO and determines that delta between T0[11] and T0[9] is more than the threshold.

Operation 9U records pulse[11] in the 5-length sliding window. Operation 9U updates PRI2 to the delta between T0[11] and T0[9], updates PRI1 to the delta between T0[10] and T0[9], and updates PRI0 to delta between T0[9] and T0[8].

Operation 9V reads T0[12] for the next pulse, pulse[12], from the FIFO and determines that delta between T0[12] and T0[11] is less than the threshold. Operation 9V then skips pulse[12] by not recording pulse[12] in the 5-length sliding window.

Operation 9W updates PRI2 to the delta between T0[12] and T0[11], updates PRI1 to the delta between T0[11] and T0[9], and updates PRI0 to delta between T0[10] and T0[9]. Operation 9W determines $0 < PRI0 \leq threshold$, $PRI1 > threshold$, $0 < PRI2 \leq threshold$, and $|PRI2 - PRI0| \leq tolerance$. In one embodiment, the threshold may be a predefined threshold. The 5-length sliding window is determined to contain two consecutive full pulses that are broken into four partial pulses. The 5-length sliding window will then be selected to pulse calibrate and to verify the pulse calibration of PRI_ref and PW_delta. Operation 9W may be performed by operations 605 and 607 of method 600.

Operation 9X estimates or calibrates the PRI_ref to PRI1 and estimates or calibrates the PW_delta to PRI2. Operation 9X verifies the calibrated PRI_ref and PW_delta using pulse[5], pulse[6], and pulse[8] of the 5-length sliding window that contains pulse[5], pulse[6], pulse[8], pulse[9], and pulse[11].

Operation 9Y verifies the calibrated PRI_ref and PW_delta using pulse[6], pulse[8], and pulse[9] of the 5-length sliding window.

Operation 9Z verifies the calibrated PRI_ref and PW_delta using pulse[8], pulse[9], and pulse[11] of the 5-length sliding window. If operations 9X, 9Y, and 9Z are successful, the calibration and verification of PRI_ref and PW_delta is declared successful. The pulse interval calibration stage is complete and method 600 proceeds to the PRI/PW correction stage to correct the impaired pulses using the calibrated PRI_ref and PW_delta. Operations 9x, 9Y, and 9Z may be performed by operations 609 and 611 of method 600, or by method 800 of FIG. 8.

Figure 10A:
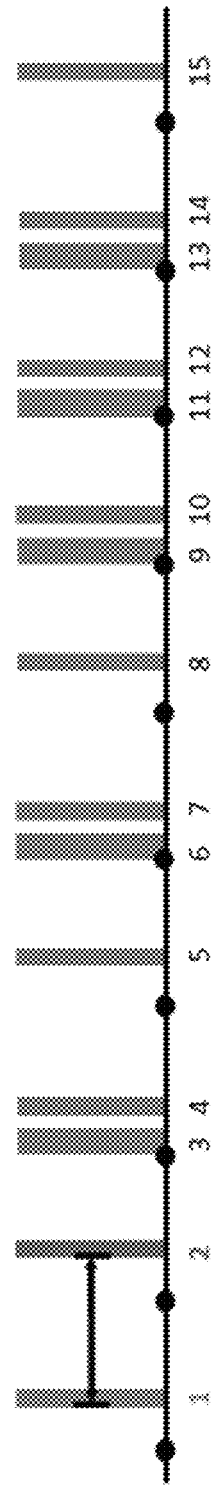
FIGS. 10A-10Z illustrate the results of a first sequence of operations to apply the pulse combination and PRI/PW correction stage of the second method to a burst of received radar pulses that have been impaired due to channel and filtering effects to correct the PRI and PW of the impaired pulses, in accordance with some embodiments of the present disclosure.
Figure 10B:
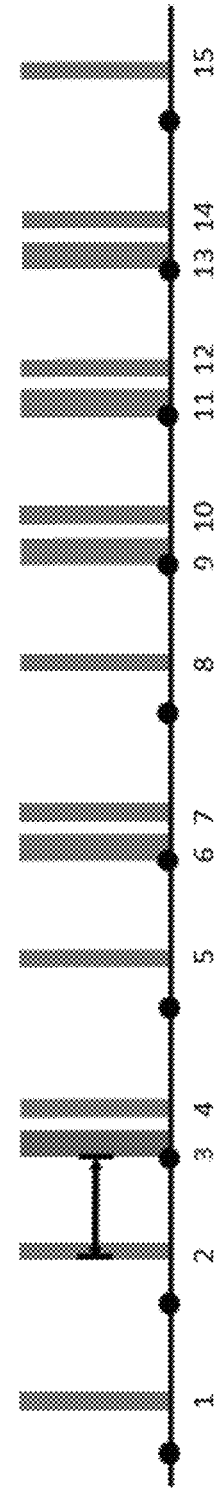
Figure 10C:
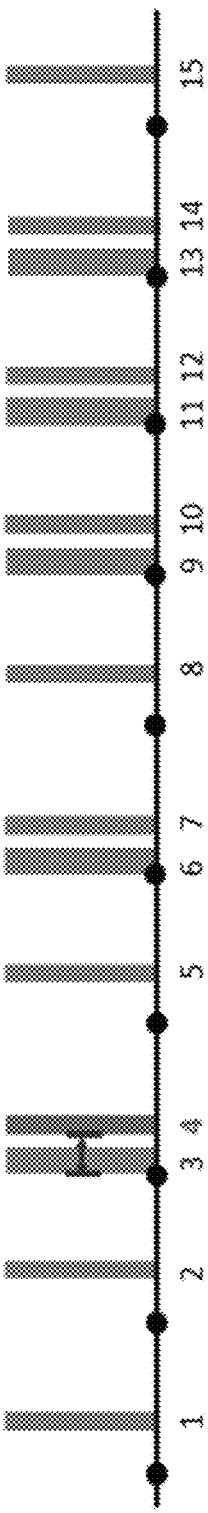
Figure 10D:
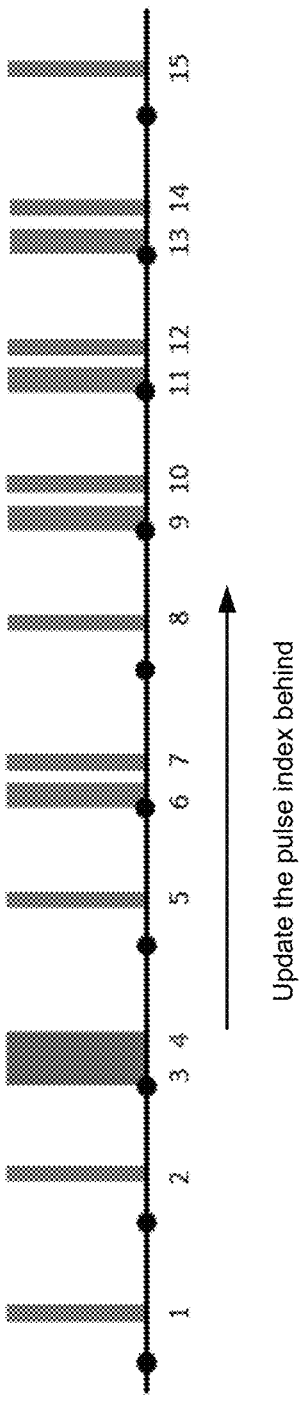
Figure 10E:
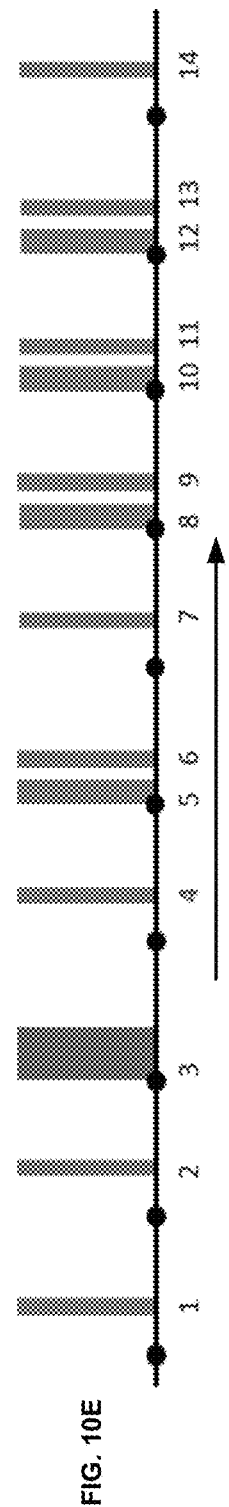
Figure 10F:
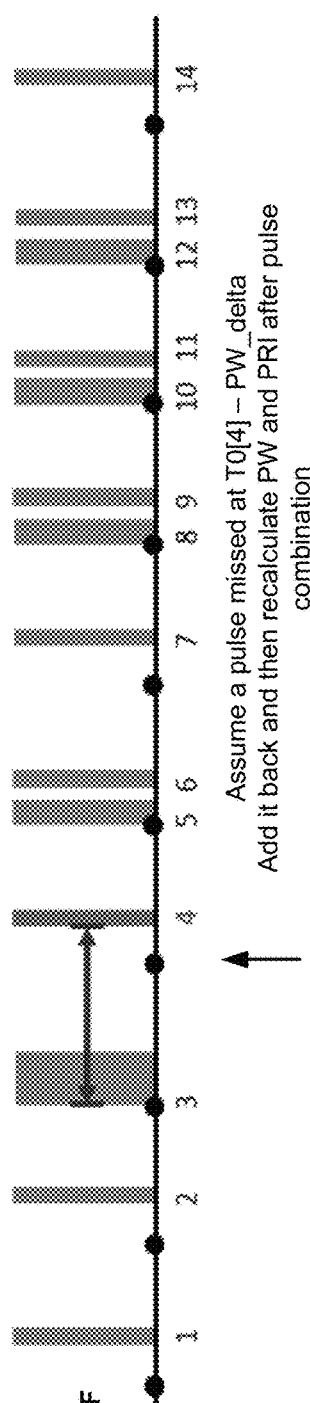
Figure 10J:
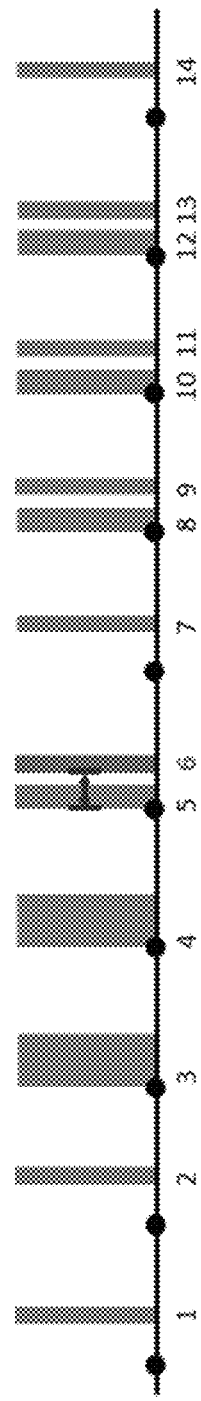
Figure 10K:
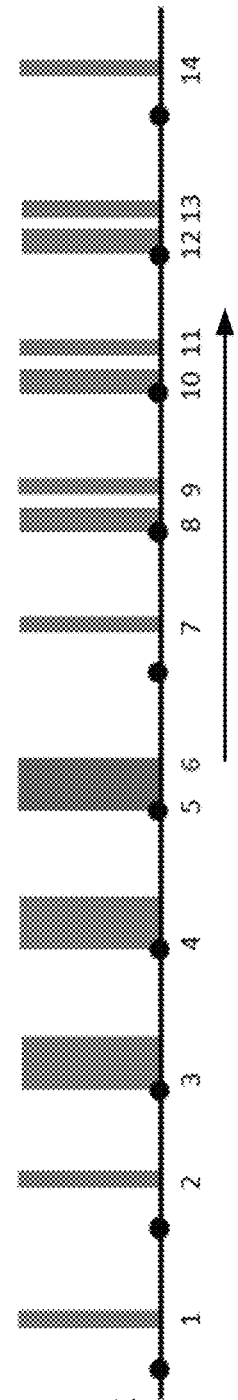
Figure 10L:
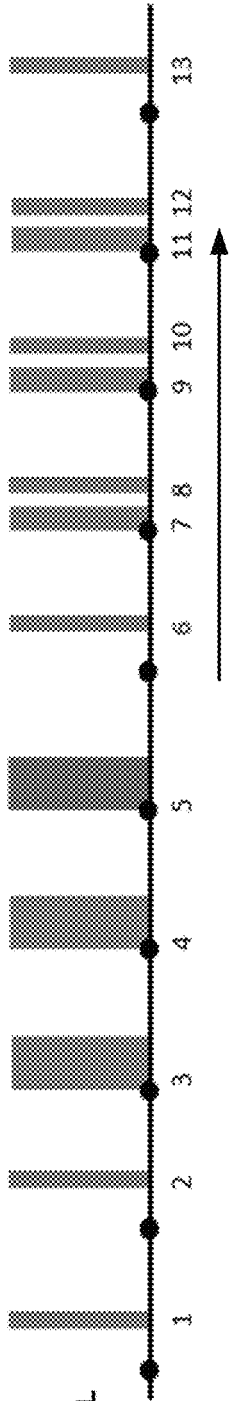
Figure 10M:
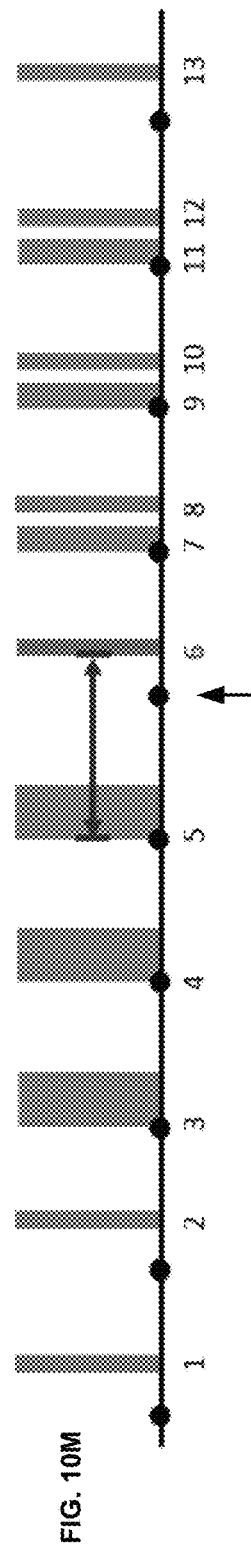
Figure 10N:
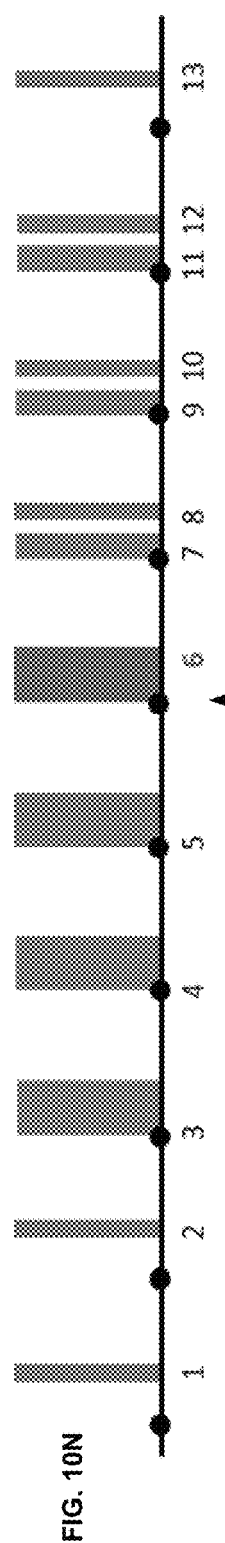
Figure 10O:
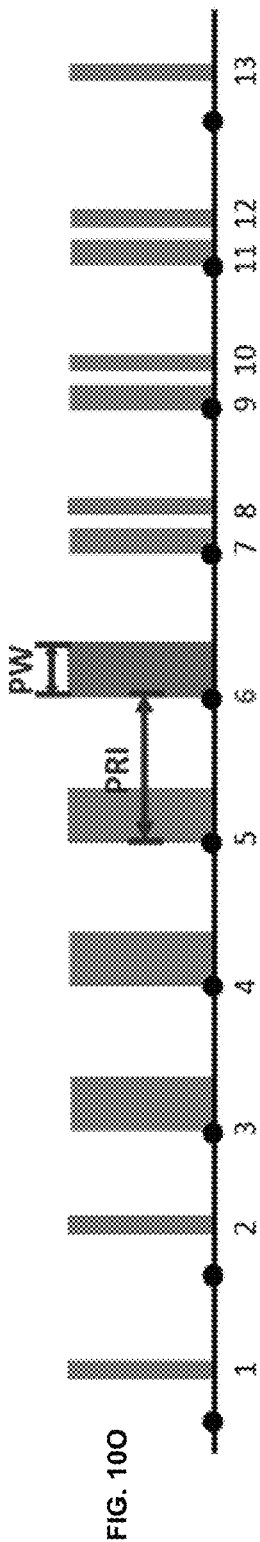
Figure 10Y:
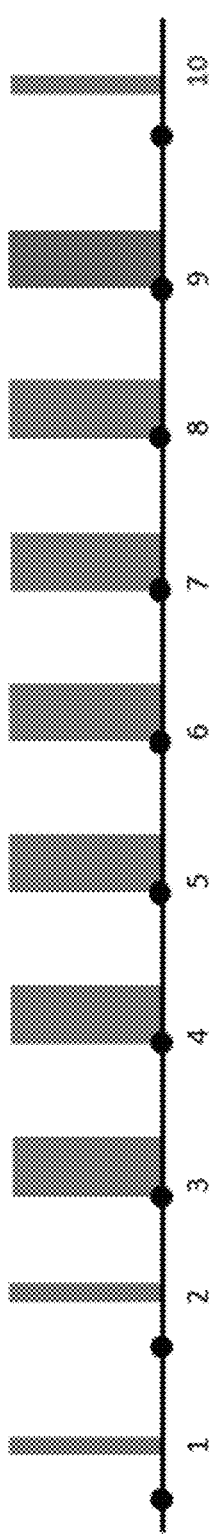
Figure 10Z:
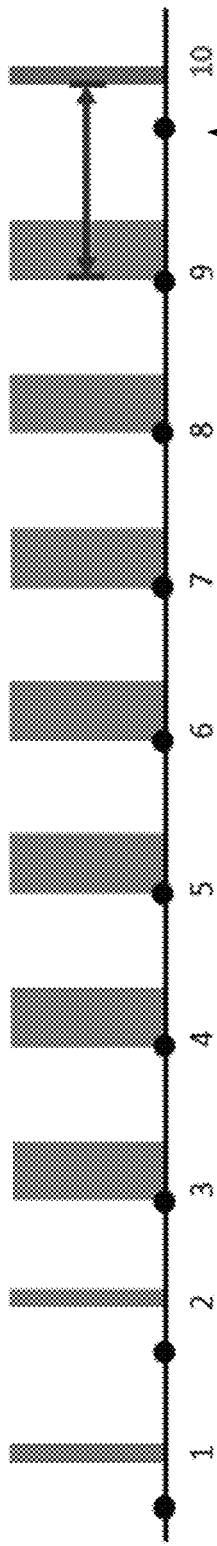

FIGS. 10A-10Z illustrate the results of a first sequence of operations when applying the pulse combination and PRI/PW correction stage of the second method 600 to a burst of received radar pulses that have been impaired due to channel and filtering effects, in accordance with some embodiments of the present disclosure. The sequence of operations corrects the PRI and PW of the impaired pulses using the calibrated PRI_ref and PW_delta from the pulse interval calibration stage of method 600.

Operation 10A reads the T0 and PW of the 15 pulses from the FIFO in a second pass through the stored pulses. The pulses are indexed from 1 to 15 and the T0 and PW for the pulses are labeled T0[1:15] and PW[1:15]. Operation 10A determines that the delay (delta) between T0[2] and T0[1] is greater than a threshold.

Operation 10B reads T0[3] for the next pulse, pulse[3], from the FIFO and determines that delta between T0[3] and T0[2] is greater than the threshold.

Operation 10C reads T0[4] for the next pulse, pulse[4], from the FIFO and determines that delta between T0[4] and T0[3] is less than the threshold. Operation 10C then combines pulse[4] and pulse[3] and sets PW of the combined pulse to (delta+PW[4]). Operation 10C may be performed by operation 613 of method 600 of FIG. 6.

Operation 10D updates the indexing of the pulses after combing the pulses.

Operation 10E shows the updated index of the pulses.

Operation 10F reads T0[4] and PW[4] for the next pulse, pulse[4], after the re-indexing, from the FIFO. Operation 10F determines that the delta between T0[4] and T0[3] is equal to the sum of PRI_ref and PW_delta to within a tolerance value. Operation 10F assumes that there is a missing pulse that should have been detected at PW_delta before T0[4]. Operation 10F adds a new pulse at (T0[4]−PW_delta). Operation 10F may be performed by operations 615 and 617 of method 600 of FIG. 6.

Operation 10G combines the added pulse and pulse[4] to generate a combined pulse with a PW that is (PW[4]+PW_delta). Operation 10G then recalculates the PRI between the combined pulse and pulse[3] as the delta between (T0[4]−PW_delta) and T0[3]. Operation 10G may be performed by operation 617 of method 600 of FIG. 6.

Operation 10H shows the recalculated PRI between the combined pulse and pulse[3], and the PW of the combined pulse.

Operation 10I reads T0[5] for the next pulse, pulse[5], from the FIFO and determines that delta between T0[5] and T0[4] is greater than the threshold.

Operation 10J reads T0[6] and PW[6] for the next pulse, pulse[6], from the FIFO and determines that delta between T0[6] and T0[5] is less than the threshold. Operation 10J then combines pulse[6] and pulse[5] and sets PW of the combined pulse to (delta+PW[6]).

Operation 10K updates the indexing of the pulses after combing the pulses.

Operation 10L shows the updated index of the pulses.

Operation 10M reads T0[6] and PW[6] for the next pulse, pulse[6], after the re-indexing, from the FIFO. Operation 10M determines that the delta between T0[6] and T0[5] is equal to the sum of PRI_ref and PW_delta to within a tolerance value. Operation 10M assumes that there is a missing pulse that should have been detected at PW_delta before T0[6]. Operation 10M adds a new pulse at (T0[6]−PW_delta).

Operation 10N combines the added pulse and pulse[6] to generate a combined pulse with a PW that is (PW[6]+PW_delta). Operation 10N then recalculates the PRI between the combined pulse and pulse[5] as the delta between (T0[6]−PW_delta) and T0[5].

Operation 10O shows the recalculated PRI between the combined pulse and pulse[5], and the PW of the combined pulse.

Operation 10P reads T0[7] for the next pulse, pulse[7], from the FIFO and determines that delta between T0[7] and T0[6] is greater than the threshold.

Operation 10Q reads T0[8] and PW[8] for the next pulse, pulse[8], from the FIFO and determines that delta between T0[8] and T0[7] is less than the threshold. Operation 10Q then combines pulse[8] and pulse[7] and sets PW of the combined pulse to (delta+PW[8]).

Operation 10R updates the indexing of the pulses after combing the pulses.

Operation 10S shows the updated index of the pulses. Operation 10S reads T0[8] for the next pulse, pulse[8], after the re-indexing, from the FIFO and determines that delta between T0[8] and T0[7] is greater than the threshold.

Operation 10T reads T0[9] and PW[9] for pulse[9], from the FIFO and determines that delta between T0[9] and T0[8] is less than the threshold. Operation 10T then combines pulse[9] and pulse[8] and sets PW of the combined pulse to (delta+PW[9]).

Operation 10U updates the indexing of the pulses after combing the pulses.

Operation 10V shows the updated index of the pulses. Operation 10V reads T0[9] for the next pulse, pulse[9], after the re-indexing, from the FIFO and determines that delta between T0[9] and T0[8] is greater than the threshold Operation 10W reads T0[10] and PW[10] for pulse[10], from the FIFO and determines that delta between T0[10] and T0[9] is less than the threshold. Operation 10W then combines pulse[10] and pulse[9] and sets PW of the combined pulse to (delta+PW[10]).

Operation 10X updates the indexing of the pulses after combing the pulses.

Operation 10Y shows the updated index of the pulses.

Operation 10Z reads T0[10] and PW[10] for the next pulse, pulse[10], after the re-indexing, from the FIFO. Operation 10Z determines that the delta between T0[10] and T0[9] is equal to the sum of PRI_ref and PW_delta to within a tolerance value. Operation 10Z assumes that there is a missing pulse that should have been detected at PW_delta before T0[10]. Operation 10Z adds a new pulse at (T0[6]−PW_delta).

Figure 11A:
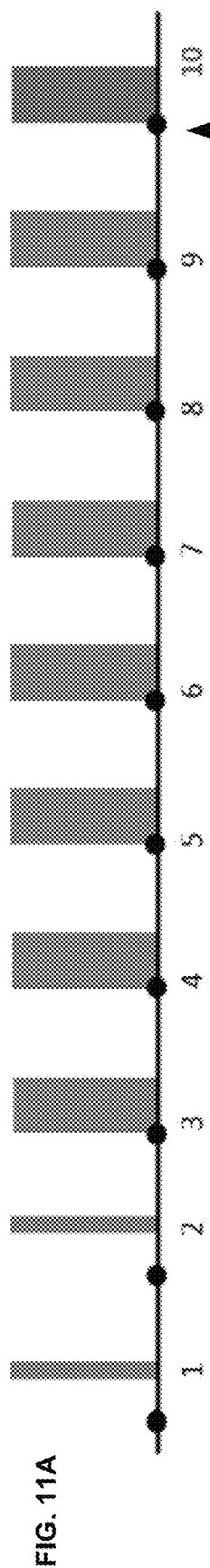
Figure 11B:
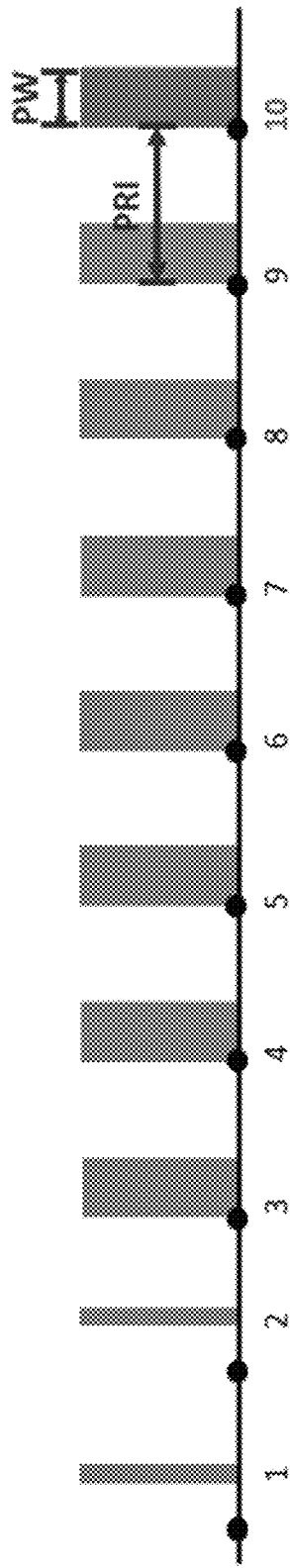

FIGS. 11A-11D illustrates the results of a second sequence of operations when applying, and FIG. 11E illustrates the results after applying, the pulse combination and PRI/PW correction stage of the second method 600 to a burst of received radar pulses that have been impaired due to channel and filtering effects, in accordance with some embodiments of the present disclosure. FIGS. 11A-11E show the sequence of operations that follow the sequence of operations of FIGS. 10A-10Z.

Operation 11A combines the added pulse and pulse[10] to generate a combined pulse with a PW that is (PW[10]+PW_delta). Operation 11A then recalculates the PRI between the combined pulse and pulse[9] as the delta between (T0[10]−PW_delta) and T0[9].

Operation 11B shows the recalculated PRI between the combined pulse and pulse[9], and the PW of the combined pulse.

Operation 11C shows the original radar pulses from the transmitter with uniform PW and PRI.

Operation 11D shows the received pulses at the WLAN device impaired due to the channel and filtering effects. The impaired pulses have broken pulses showing shortened PW and varying PRI.

Operation 11E shows the reconstructed pulses after applying method 600 to correct the PRI and PW of the impaired pulses. The reconstructed pulses exhibit relatively uniform PW and PRI.

Figure 12:
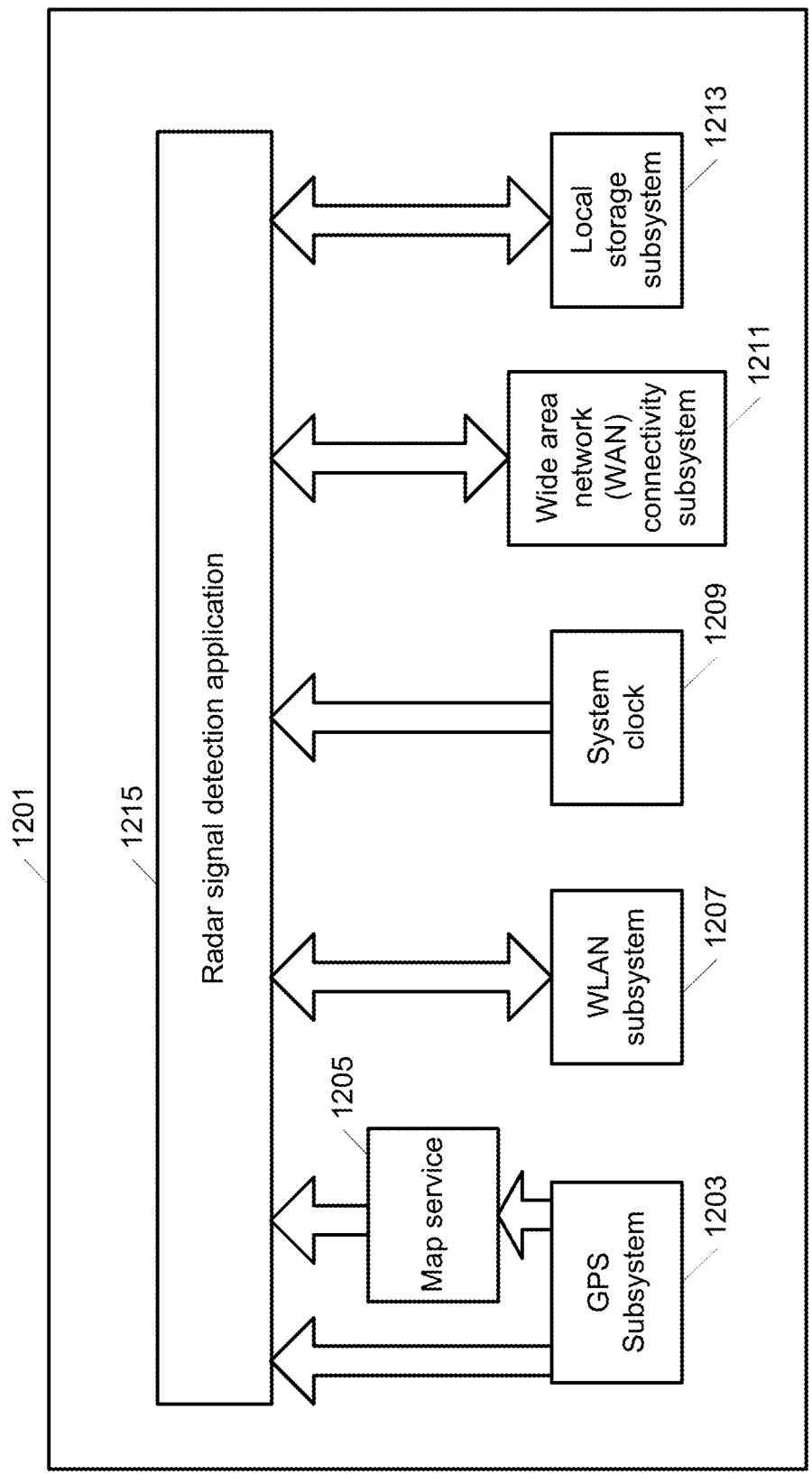
FIG. 12 is a block diagram of a WLAN device deployed to operate in WLAN DFS channels shared with radars and configured to detect radar signals, in accordance with some embodiments of the present disclosure.

FIG. 12 is a block diagram of a WLAN DFS device 1201 deployed in an automobile configured to detect radar signals, in accordance with some embodiments of the present disclosure. The WLAN DFS device 1201 may be the AP 105 or the WLAN device on the vehicles 101, 103, and may practice the operations of methods 400, 600, and 800.

The WLAN DFS device 1201 may be a WLAN DFS master device or a slave device. The WLAN DFS device 1201 may include a GPS subsystem 1203, a map service 1205, a WLAN subsystem 1207, system clock 1209, a wide area network (WAN) connectivity subsystem 1211, a local storage subsystem 1213, and a radar signal detection application 1215.

The GPS subsystem 1203 may be configured to provide the GPS coordinates of the WLAN DFS device 1201. The GPS coordinates may be used to geo-tag a detected radar signal for a WLAN DFS master device. The map service 1205 may be configured to map the GPS coordinates provided by the GPS subsystem 1203 to a path of travel and may also provide navigation services for a vehicle.

The WLAN subsystem 1207 may be configured to use a selected channel for WLAN operation. For example, the WLAN subsystem 1207 may be configured to transmit or receive data packet, control frames, etc., with other WLAN DFS devices or an AP over a WLAN channel. The system clock 1209 may be configured to keep track of the system time used to time stamp a detected radar signal by a WLAN DFS master device. In one embodiment, the GPS subsystem 1203 may be configured to provide the system time.

The WAN connectivity subsystem 1211 may be configured by a WLAN DFS master device to upload information on detected radar signals including the DFS channels of the detected radar signals, recorded GPS coordinates and recorded times at which the radar signals are detected to a collaborative network server. The WAN connectivity subsystem 1211 may also be configured by both a WLAN DFS master and slave device to transmit the current GPS coordinates of the WLAN DFS device 1201 and to receive information on radar interference near the current GPS coordinates from the collaborative network server.

The local storage subsystem 1213 may be configured to store a local database of geo-tagged, time-stamped radar interference signals.

The radar signal detection application 1215 may be run on a processor to perform one or more of the operations in the methods 400, 600, and 800 of FIGS. 4, 6, and 8 for the WLAN DFS device 1201 to calibrate the PRI_ref and PW_delta of impaired radar pulses due to channel and filtering effects, and to use the calibrated results to correct the PRI and PW of the impaired radar pulses.

In one embodiment, the WLAN DFS device 1201 may include a memory and a processing device. The memory may be synchronous dynamic random access memory (DRAM), read-only memory (ROM)), or other types of memory, which may be configured to store the radar signal detection application 1215 or the local storage subsystem 1213. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

Figure 13:
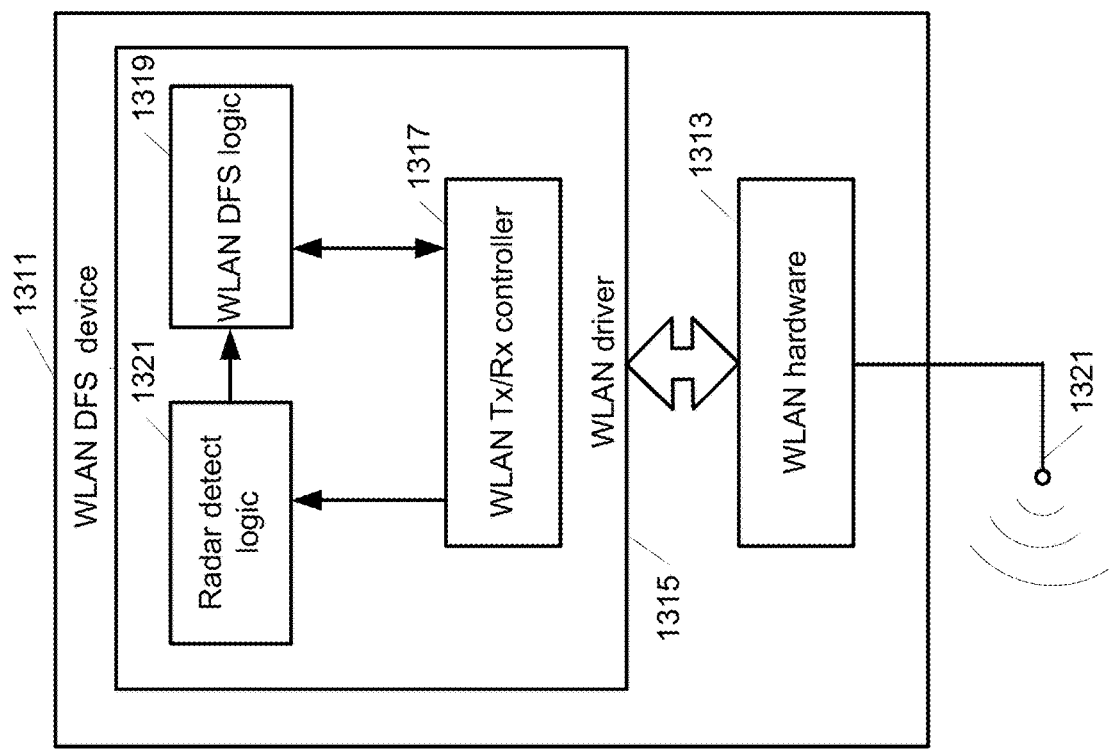
FIG. 13 is a block diagram of a WLAN DFS device showing hardware and software drivers deployed to operate in WLAN DFS channels shared with radars and configured to detect radar signals, in accordance with some embodiments of the present disclosure.

FIG. 13 is a block diagram of a WLAN DFS device 1311 deployed in an automobile configured to receive radar signals on DFS channels, in accordance with some embodiments of the present disclosure. The WLAN DFS device 1311 may be the AP 105 or the WLAN device on the vehicles 101, 103, and may practice the operations of methods 400, 600, and 800.

The WLAN DFS device 1311 may include one or more antennas 1321, WLAN hardware 1313 and WLAN driver 1315. The WLAN driver 1315 may include WLAN Tx/RX controller 1317, WLAN DFS logic 1319, and radar signal detection logic 1321. The WLAN hardware 1313 may be configured to transmit or receive WLAN packets on an operating channel through the antennas 1321. The antennas 1321 may also be used to received radar signals on DFS channels. In one embodiment, the WLAN hardware 1313 may be configured to determine if the power level of received signals exceeds a detection threshold, such as illustrated in FIGS. 2A-2B.

The WLAN Tx/Rx controller 1317 may be configured to demodulate and decode received WLAN packets and to encode and modulate WLAN packets for transmission. The radar signal detection logic 1321 and the WLAN DFS logic 1319 may be configured to detect radar signals on DFS channels. In one embodiment, the WLAN DFS logic 1319 may implement drivers to read stored signals in hardware, and to process the signals to perform the PRI calibration and the PRI/PW correction disclosed herein to reconstruct the signal waveforms. In one embodiment, the radar signal detection logic 1321 may process the reconstructed waveforms to determine if the receives signals are radar signals.

If the current operating channel is used by a nearby radar, the WLAN DFS logic 1319 may be configured to switch to a new channel for WLAN operation.

In one embodiment, the WLAN DFS device 1311 may include a memory and a processing device. The memory may be synchronous dynamic random access memory (DRAM), read-only memory (ROM)), or other types of memory, which may be configured to store the code to perform the function of the WLAN driver 1315. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of performing dynamic frequency selection (DFS) by a wireless local area network (WLAN) device, comprising:
receiving, by the WLAN device, a burst of signal pulses on a DFS channel, the burst of received signal pulses having at least one of a non-uniform pulse width (PW) or a non-uniform pulse repetition interval (PRI);
processing the burst of received signal pulses to generate calibrated PRI values;
correcting the burst of received signal pulses based on the calibrated PRI values to generate a burst of reconstructed signal pulses by adjusting at least one of the non-uniform PW or the non-uniform PRI of the received signal pulses; and
detecting a radar signal based on the burst of reconstructed signal pulses.

2. The method of claim 1, wherein the calibrated PRI values comprise:
an estimated PRI (PRI_ref) of the radar signal as transmitted by a radar; and
an estimated delay (PW_delta) between a plurality of partial signal pulses broken from a single signal pulse of the radar signal as transmitted by the radar.

3. The method of claim 2, wherein processing the burst of received signal pulses to generate calibrated PRI values comprises:
determining if a time delta between two consecutively received signal pulses is less than or equal to a threshold;

estimating the PW_delta to be the time delta in response to determining that the time delta is less or equal to the threshold; and estimating the PRI_ref to be the time delta in response to determining the time delta is greater than the threshold.

4. The method of claim 2, wherein correcting the burst of received signal pulses based on the calibrated PRI values comprises:

determining if a time delta between two consecutively received signal pulses is equal to a sum of the PRI_ref and the PW_delta to within a tolerance;

adding a new pulse at PW_delta before a latter pulse of the two consecutively received signal pulses; and combining the new pules with the latter pulse into a combined pulse having a PW equal to a sum of the PW_delta and a PW of the latter pulse.

5. The method of claim 3, wherein processing the burst of received signal pulses to generate calibrated PRI values further comprises:

determining the PW_delta to be either of two successive estimations of the PW_delta when a difference between the two successive estimations of the PW_delta is within a tolerance.

6. The method of claim 3, wherein processing the burst of received signal pulses to generate calibrated PRI values further comprises:

determining the PRI_ref to be either of two successive estimations of the PRI_ref when a difference between the two successive estimations of the PRI_ref is within a tolerance.

7. The method of claim 3, wherein processing the burst of received signal pulses to generate calibrated PRI values further comprises:

verifying the PW_delta and the PRI_ref for a sliding window of a specified number of signal pulses from the burst of received signal pulses.

8. The method of claim 1, wherein correcting the burst of received signal pulses based on the calibrated PRI values comprises:

determining if a time delta between two consecutively received signal pulses is less than or equal to a threshold; and combining the two consecutively received signal pulses into a single pulse of the reconstructed signal pulses in response to determining that the time delta is less than or equal to the threshold.

9. The method of claim 1, wherein correcting the burst of received signal pulses based on the calibrated PRI values comprises:

correcting a subset of the received signal pulses in the burst based on the calibrated PRI values to generate the burst of reconstructed signal pulses.

10. A wireless local area network (WLAN) device, comprising:

a WLAN interface configured to operate the WLAN device on a dynamic frequency selection (DFS) channel; and a processing device configured to:

receive a burst of signal pulses on the DFS channel, the burst of received signal pulses having at least one of a non-uniform pulse width (PW) or a non-uniform pulse repetition interval (PRI);

process the burst of received signal pulses to generate calibrated PRI values;

correct the burst of received signal pulses based on the calibrated PRI values to generate a burst of reconstructed signal pulses by adjusting at least one of the non-uniform PW or the non-uniform PRI of the received signal pulses; and detect a radar signal based on the burst of reconstructed signal pulses.

11. The WLAN device of claim 10, wherein the calibrated PRI values comprise:

an estimated PRI (PRI_ref) of the radar signal as transmitted by a radar; and an estimated delay (PW_delta) between a plurality of partial signal pulses broken from a single signal pulse of the radar signal as transmitted by the radar.

12. The WLAN device of claim 11, wherein the processing device configured to process the burst of received signal pulses to generate calibrated PRI values comprises the processing device configured to:

determine if a time delta between two consecutively received signal pulses is less than or equal to a threshold;

estimate the PW_delta to be the time delta in response to determining that the time delta is less or equal to the threshold; and estimate the PRI_ref to be the time delta in response to determining the time delta is greater than the threshold.

13. The WLAN device of claim 11, wherein the processing device configured to correct the burst of received signal pulses based on the calibrated PRI values comprises the processing device configured to:

determine if a time delta between two consecutively received signal pulses is equal to a sum of the PRI_ref and the PW_delta to within a tolerance;

add a new pulse at PW_delta before a latter pulse of the two consecutively received signal pulses; and combine the new pules with the latter pulse into a combined pulse having a PW equal to a sum of the PW_delta and a PW of the latter pulse.

14. The WLAN device of claim 12, wherein the processing device configured to process the burst of received signal pulses to generate calibrated PRI values comprises the processing device further configured to:

determine the PW_delta to be either of two successive estimations of the PW_delta when a difference between the two successive estimations of the PW_delta is within a tolerance.

15. The WLAN device of claim 12, wherein the processing device configured to process the burst of received signal pulses to generate calibrated PRI values comprises the processing device further configured to:

determine the PRI_ref to be either of two successive estimations of the PRI_ref when a difference between the two successive estimations of the PRI_ref is within a tolerance.

16. The WLAN device of claim 12, wherein the processing device configured to process the burst of received signal pulses to generate calibrated PRI values comprises the processing device further configured to:

verify the PW_delta and the PRI_ref for a sliding window of a specified number of signal pulses from the burst of received signal pulses.

17. The WLAN device of claim 10, wherein the processing device configured to correct the burst of received signal pulses based on the calibrated PRI values comprises the processing device configured to:

determine if a time delta between two consecutively received signal pulses is less than or equal to a threshold; and combine the two consecutively received signal pulses into a single pulse of the reconstructed signal pulses in response to determining that the time delta is less than or equal to the threshold.

18. The WLAN device of claim 10, wherein the processing device configured to correct the burst of received signal pulses based on the calibrated PRI values comprises the processing device configured to:
correct a subset of the received signal pulses in the burst based on the calibrated PRI values to generate the burst of reconstructed signal pulses.

19. A communication device, comprising:
one or more antennas; and
a processing device connected to the one or more antennas, the processing device configured to:
receive a burst of signal pulses on a dynamic frequency selection (DFS) channel, the burst of received signal pulses having at least one of a non-uniform pulse width (PW) or a non-uniform pulse repetition interval (PRI);
process the burst of received signal pulses to generate calibrated PRI values;
correct the burst of received signal pulses based on the calibrated PRI values to generate a burst of reconstructed signal pulses by adjusting at least one of the non-uniform PW or the non-uniform PRI of the received signal pulses; and
detect a radar signal based on the burst of reconstructed signal pulses.

20. The communication device of claim 19, wherein the calibrated PRI values comprise:
an estimated PRI (PRI_ref) of the radar signal as transmitted by a radar; and
an estimated delay (PW_delta) between a plurality of partial signal pulses broken from a single signal pulse of the radar signal as transmitted by the radar.

* * * * *